United States Patent
Yada

(10) Patent No.: US 12,122,167 B2
(45) Date of Patent: Oct. 22, 2024

(54) NON-TRANSITORY COMPUTER-READABLE RECORDING MEDIUM STORING COMPUTER-READABLE INSTRUCTIONS FOR INFORMATION PROCESSING DEVICE, INFORMATION PROCESSING DEVICE, AND METHOD EXECUTED BY INFORMATION PROCESSING DEVICE

(71) Applicant: BROTHER KOGYO KABUSHIKI KAISHA, Nagoya (JP)

(72) Inventor: Yuki Yada, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 233 days.

(21) Appl. No.: 17/703,540

(22) Filed: Mar. 24, 2022

(65) Prior Publication Data

US 2022/0212475 A1 Jul. 7, 2022

Related U.S. Application Data

(63) Continuation of application No. PCT/JP2020/031980, filed on Aug. 25, 2020.

(30) Foreign Application Priority Data

Sep. 25, 2019 (JP) .................................. 2019-174166

(51) Int. Cl.
 B41J 2/175 (2006.01)
(52) U.S. Cl.
 CPC ....... B41J 2/17566 (2013.01); B41J 2/17513 (2013.01); B41J 2/17546 (2013.01); B41J 2002/17589 (2013.01)
(58) Field of Classification Search
 CPC .......................... B41J 2/17566; B41J 2/17513; B41J 2/17546; B41J 2002/17589; G03G 21/00; G06F 3/0481; G06F 3/12
 See application file for complete search history.

(56) References Cited

U.S. PATENT DOCUMENTS 6,330,402 B1   12/2001   Sakurai et al.
7,283,258 B1   10/2007   Kuno et al.
(Continued)

FOREIGN PATENT DOCUMENTS

JP    2000-71568 A    3/2000
JP    2001-83846 A    3/2001
(Continued)

OTHER PUBLICATIONS

International Search Report and Written Opinion of the International Search Report for PCT/JP2020/031980 dated Oct. 20, 2020.
(Continued)

*Primary Examiner* — Justin Seo
*Assistant Examiner* — Tracey M McMillion
(74) *Attorney, Agent, or Firm* — KENEALY VAIDYA LLP

(57) ABSTRACT

An information processing device may acquire, from each of a plurality of printers, remaining amount information related to a remaining amount of colorant in the printer and display a remaining amount screen which includes remaining amount objects each corresponding to respective one of the plurality of printers using a plurality of the acquired remaining amount information. A first-type remaining amount object corresponding to a first-type printer including a tank may include a first cartridge object and a tank object. A second-type remaining amount object corresponding to a second-type printer not including a tank may include a second cartridge object. In a predetermined direction, a position of the tank object corresponding to an unprintable remaining amount in the first-type remaining amount object and a position of the second cartridge object corresponding to the unprintable remaining amount in the second-type remaining amount object may be same as each other.

13 Claims, 11 Drawing Sheets

(56) References Cited

U.S. PATENT DOCUMENTS

| | | |
|---|---|---|
| 2010/0074633 A1 | 3/2010 | Kuwasaki |
| 2015/0316884 A1 | 11/2015 | Shinagawa |
| 2019/0034132 A1 | 1/2019 | Yamada |
| 2019/0107984 A1 | 4/2019 | Kanamori |
| 2019/0163413 A1* | 5/2019 | Suzuki .................. G06F 3/1259 |
| 2019/0275803 A1 | 9/2019 | Miyazawa |
| 2019/0299645 A1 | 10/2019 | Miyazawa |
| 2019/0346800 A1 | 11/2019 | Nogawa et al. |
| 2020/0210126 A1 | 7/2020 | Miyazawa |
| 2020/0341421 A1 | 10/2020 | Nogawa et al. |

FOREIGN PATENT DOCUMENTS

| | | |
|---|---|---|
| JP | 2007-122239 A | 5/2007 |
| JP | 2010-79575 A | 4/2010 |
| JP | 2016208528 A | 12/2016 |
| JP | 2018-92198 A | 6/2018 |
| JP | 2019-28756 A | 2/2019 |
| JP | 2019070926 A | 5/2019 |
| JP | 2019-153256 A | 9/2019 |
| JP | 2019174907 A | 10/2019 |
| JP | 2019175295 A | 10/2019 |
| JP | 2019197408 A | 11/2019 |
| JP | 2020019171 A | 2/2020 |
| JP | 2020104359 A | 7/2020 |
| WO | 2021/059824 A1 | 4/2021 |

OTHER PUBLICATIONS

International Preliminary Report on Patentability dated Mar. 15, 2022 and English language Written Opinion of the International Search Report for PCT/JP2020/031980 dated Oct. 20, 2020.
Japanese Office Action for the priority Japanese Patent Application No. 2019-174166 dated Aug. 22, 2023.

* cited by examiner

FIG. 5

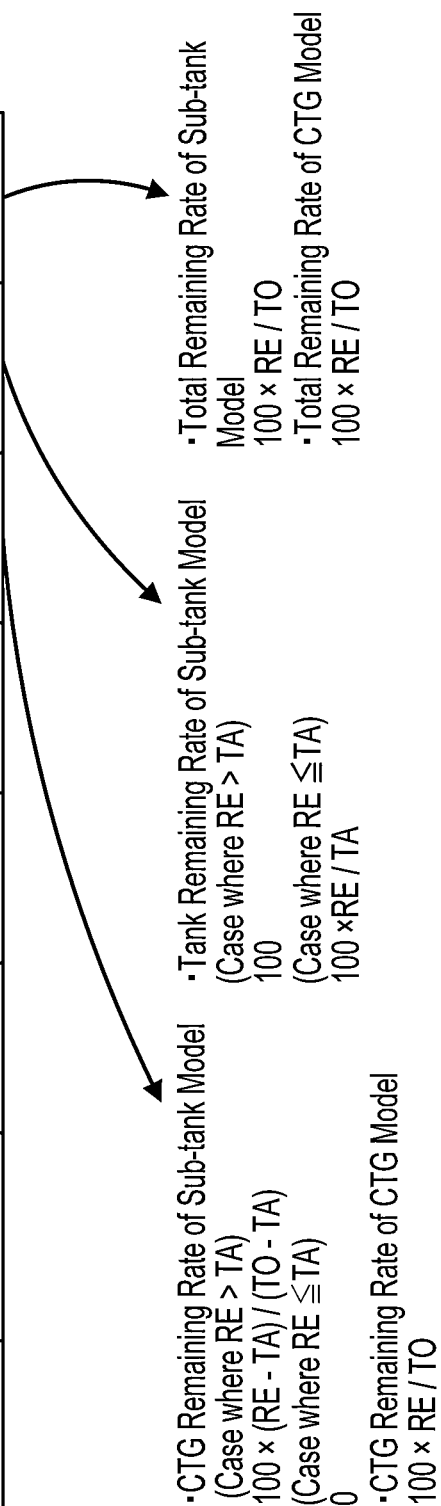

Management Database 40

| Printer Name | Model Name | Ink Supply Model | Number of Total Sheets TO | Number of Tank Sheets TA | Number of Remaining Sheets RE | CTG Remaining Rate | Tank Remaining Rate | Total Remaining Rate |
|---|---|---|---|---|---|---|---|---|
| Pa | Ma | Sub-tank | TOa | TAa | REa | 55 | 100 | 60 |
| Pb | Mb | Sub-tank | TOb | TAb | REb | 0 | 0 | 0 |
| Pc | Mc | CTG | TOc | - | REc | 10 | - | 10 |
| Pd | Md | CTG | TOd | - | REd | 70 | - | 70 |
| ... | ... | ... | ... | ... | ... | ... | ... | ... |

- CTG Remaining Rate of Sub-tank Model
  (Case where RE > TA)
  $100 \times (RE - TA) / (TO - TA)$
  (Case where RE $\leq$ TA)
  0
- CTG Remaining Rate of CTG Model
  $100 \times RE / TO$

- Tank Remaining Rate of Sub-tank Model
  (Case where RE > TA)
  100
  (Case where RE $\leq$ TA)
  $100 \times RE / TA$

- Total Remaining Rate of Sub-tank Model
  $100 \times RE / TO$
- Total Remaining Rate of CTG Model
  $100 \times RE / TO$

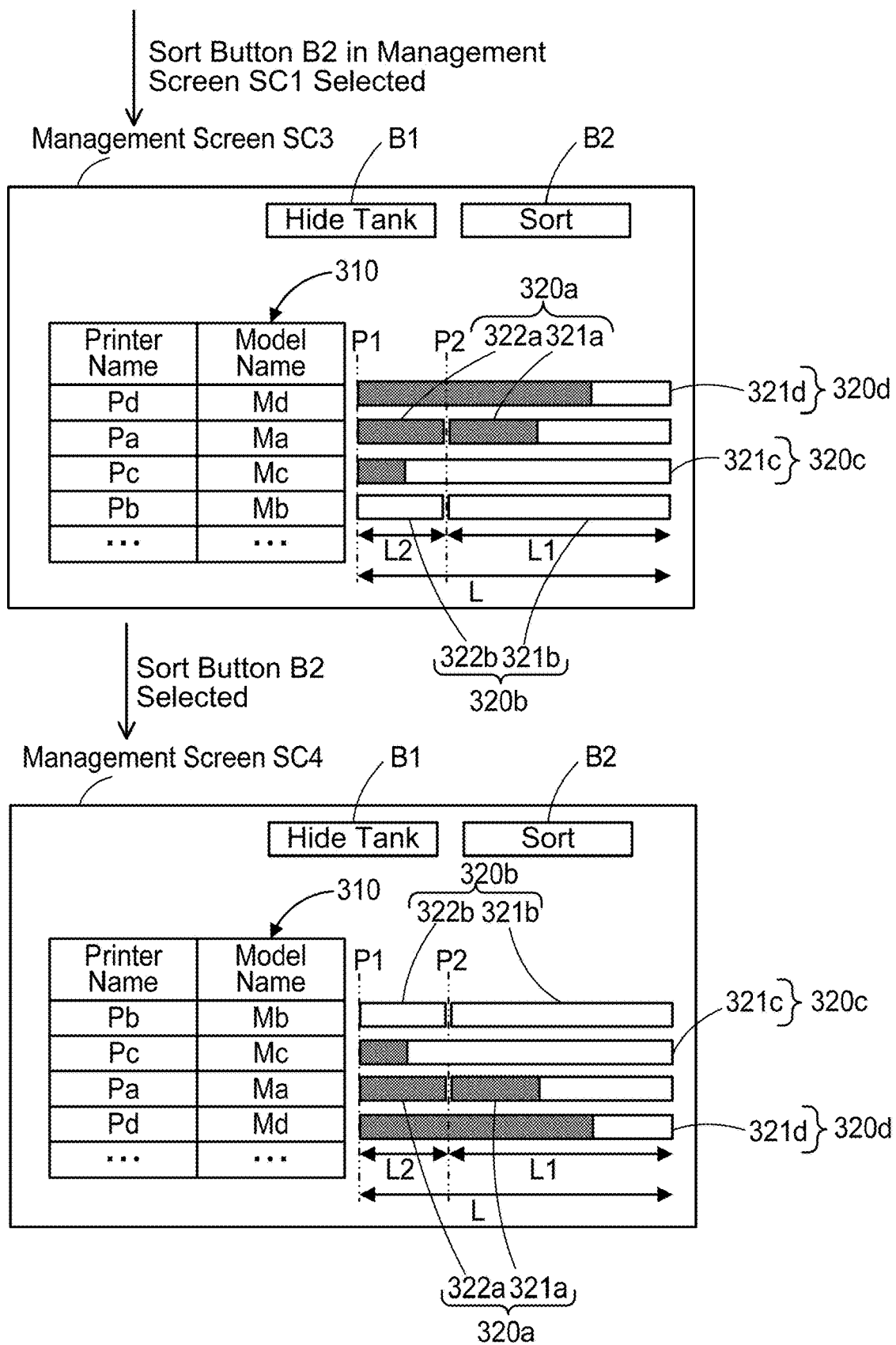

NON-TRANSITORY COMPUTER-READABLE RECORDING MEDIUM STORING COMPUTER-READABLE INSTRUCTIONS FOR INFORMATION PROCESSING DEVICE, INFORMATION PROCESSING DEVICE, AND METHOD EXECUTED BY INFORMATION PROCESSING DEVICE

CROSS-REFERENCE TO RELATED APPLICATION

This is a continuation of PCT/JP2020/031980 filed on Aug. 25, 2020, which claims priority to Japanese Patent Application No. 2019-174166 filed on Sep. 25, 2019, the contents of which are hereby incorporated by reference into the present application.

BACKGROUND

An image forming device that displays a display screen including a gauge showing a remaining amount of toner in a small-capacity cartridge and a gauge showing a remaining amount of toner in a large-capacity cartridge is known.

SUMMARY

In the aforementioned image forming device, there is no assumption that a plurality of types of printers which have different methods for supplying toner to a developing means exist.

The present specification provides a technique for improving user convenience when, in a situation where first-type and second-type printers that have different methods for supplying a colorant from a cartridge to a print executing unit exist, a screen showing a remaining amount of colorant in each of the first-type printer and second-type printer is displayed.

A non-transitory computer-readable recording medium storing computer-readable instructions for an information processing device is disclosed herein. The computer-readable instructions, when executed by a processor of the information processing device, may cause the information processing device to, acquire, from each of a plurality of printers, remaining amount information related to a remaining amount of colorant in the printer. The computer-readable instructions, when executed by the processer, may cause the information processing device to display a remaining amount screen on a display unit of the information processing device using a plurality of the acquired remaining amount information. The remaining amount screen may include remaining amount objects each corresponding to respective one of the plurality of printers. Each remaining amount object may indicate a remaining amount of colorant in corresponding one of the plurality of printers. The plurality of printers may include at least one first-type printer and at least one second-type printer. Each of the at least one first-type printer may include a first print executing unit and a tank configured to store colorant supplied from a first cartridge to the first print executing unit. Each of the at least one second-type printer may include a second print executing unit and does not comprise a tank configured to store colorant supplied from a second cartridge to the second print executing unit. Each of the at least one first-type printer and the at least one second-type printer may shift from a printable state to an unprintable state in a case where the remaining amount of colorant in the printer reaches an unprintable remaining amount. The remaining amount screen may include a first-type remaining amount object corresponding to the at least one first-type printer and a second-type remaining amount object corresponding to the at least one second-type printer. The first-type remaining amount object may include a first cartridge object which indicates a remaining amount of colorant in the first cartridge and a tank object which indicates a remaining amount of colorant in the tank. The first cartridge object may have a band shape extending along a predetermined direction. The tank object may have a band shape extending along the predetermined direction. The first cartridge object and the tank object may be aligned along the predetermined direction. The second-type remaining amount object may include a second cartridge object which indicates a remaining amount of colorant in the second cartridge. The second cartridge object may have a band shape extending along the predetermined direction. In the predetermined direction, a position of the tank object corresponding to the unprintable remaining amount in the first-type remaining amount object and a position of the second cartridge object corresponding to the unprintable remaining amount in the second-type remaining amount object may be same as each other.

In the above configuration, a situation in which there are the at least one first-type printer in which the colorant is supplied to the first print executing unit via the tank from the first cartridge and the at least one second-type printer in which the colorant is supplied to the second print executing unit from the second cartridge without passing through the tank (not via the tank) is assumed. In such a situation, the information processing device displays the remaining amount screen which includes the first-type remaining amount object corresponding to the at least one first-type printer and the second-type remaining amount object corresponding to the at least one second-type printer. Here, in the predetermined direction, the position of the tank object corresponding to the unprintable remaining amount in the first-type remaining amount object and the position of the second cartridge object corresponding to the unprintable remaining amount in the second-type remaining amount object are the same as each other. Due to this, a user can easily recognize the remaining amount of colorant in the first-type printer and the remaining amount of colorant in the second-type printer, using a common position as a reference. Accordingly, user convenience can be improved.

A non-transitory computer-readable recording medium storing computer-readable instructions is novel and useful. Furthermore, an information processing device realized by the above computer-readable instructions, and a method executed by the information processing device are also novel and useful. Further, a system comprising the information processing device and the first-type and second-type printers is also novel and useful.

BRIEF DESCRIPTION OF THE DRAWINGS

FIG. 5 shows an example of a management database.

FIG. 11 shows a management screen in which remaining amount objects are sorted in a descending order and a management screen in which the remaining amount objects are sorted in an ascending order.

Figure 1:
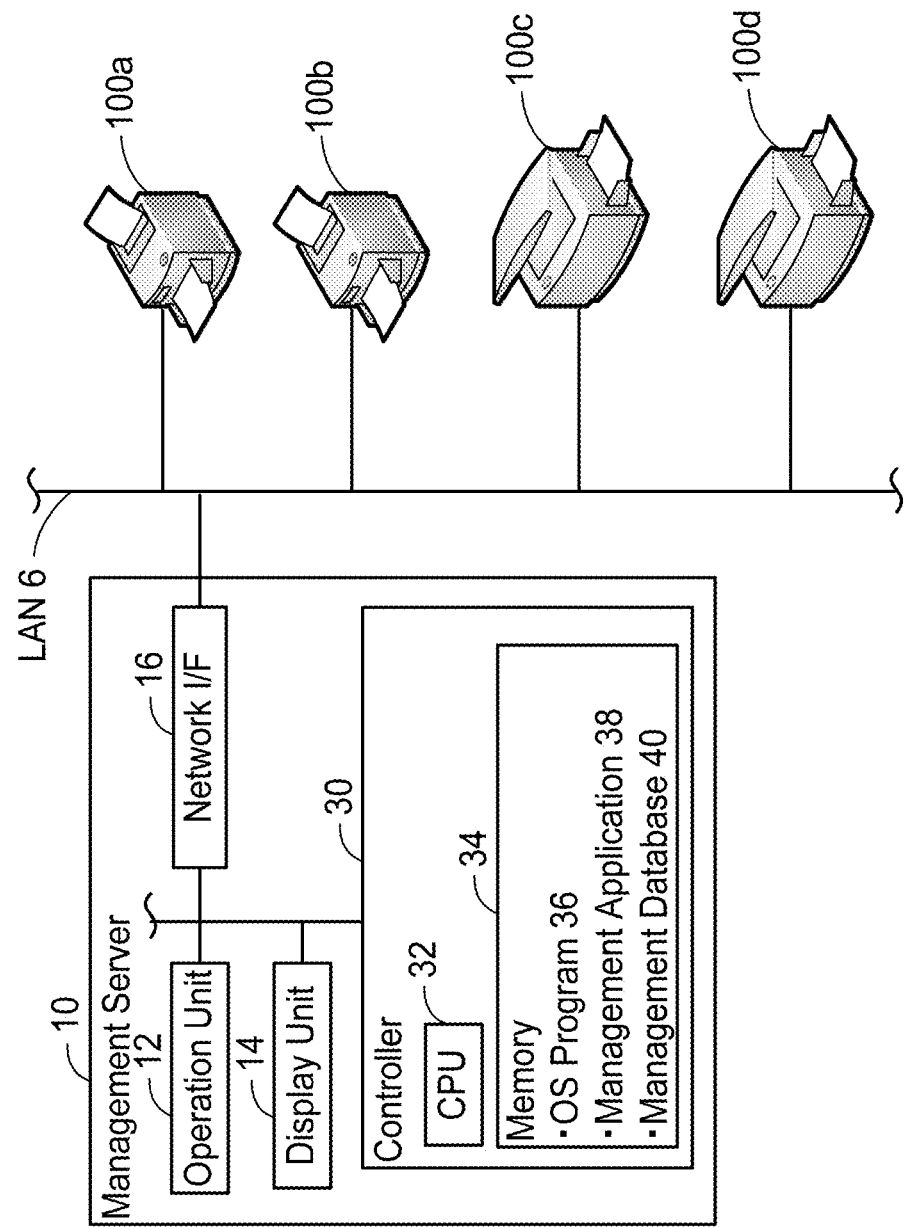
FIG. 1 shows a configuration of a communication system.

DETAILED DESCRIPTION (Configuration of Communication System 2; FIG. 1)

As shown in FIG. 1, a communication system 2 comprises a management server 10 and a plurality of printers 100a to 100d. The management server 10 and the printers 100a, etc. are connected to a Local Area Network (LAN) 6, and are capable of communicating with one another via the LAN 6. The LAN 6 may be a wired LAN or a wireless LAN.

(Configuration of Management Server 10)

The management server 10 acquires information from each of the printers 100a, etc. and manages these information. In particular, the management server 10 has a function of displaying remaining amount objects indicating amounts of ink remaining in the printers 100a, etc. The management server 10 comprises an operation unit 12, a display unit 14, a network interface 16, and a controller 30.

The operation unit 12 comprises a keyboard and a mouse operated by a user. The display unit 14 is a display for displaying various types of information. The network interface 16 is connected to the LAN 6. The LAN 6 may be a wireless LAN, or may be a wired LAN. The controller 30 comprises a CPU 32 and a memory 34. The CPU 32 executes various processes in accordance with programs 36, 38 stored in the memory 34. The memory 34 is constituted of a volatile memory, a non-volatile memory, and/or the like.

The OS program 36 is a program for realizing basic processes of the management server 10. The management application 38 is a program for acquiring printer information related to each printer of the plurality of printers 100a to 100d from the printers 100a to 100d, and executing processing using those printer information. The management application 38 is, for example, installed on the management server 10 from a medium shipped together with each of the printers 100a, etc. The memory 34 further comprises a management database 40. Contents of the management database 40 will be described later. Below, the management database 40 is termed "management DB 40".

(Configuration of Printers 100a to 100d (FIG. 2))

The printers 100a to 100d are each a peripheral device (that is, a peripheral device of a PC for example, not shown) capable of executing a print function. The printers 100a, etc. may each be a multi-function peripheral capable of executing a scan function, copy function, FAX function, etc. in addition to the print function.

Figure 2:
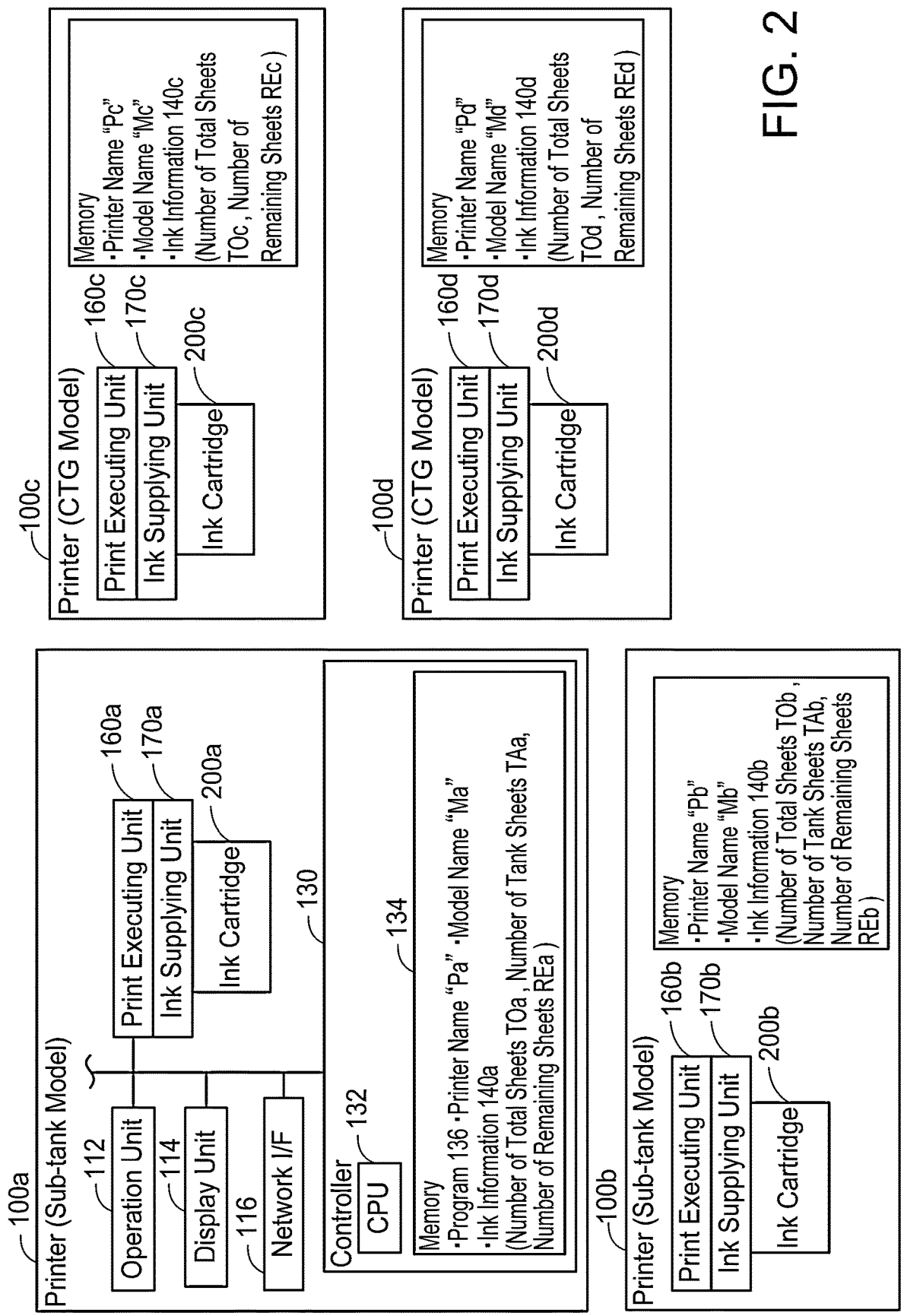
FIG. 2 shows configurations of respective printers.

As Shown in FIG. 2, the printer 100a comprises an operation unit 112, a display unit 114, a network interface 116, a controller 130, a print executing unit 160a, and an ink supplying unit 170a.

The operation unit 112 comprises a plurality of keys to be operated by the user. The display unit 114 is a display for displaying various types of information. The network interface 116 is connected to the LAN 6. The controller 130 comprises a CPU 132 and a memory 134. The CPU 132 executes various processes in accordance with a program 136 stored in the memory 134. The memory 134 is constituted of a volatile memory, a non-volatile memory, and/or the like. The print executing unit 160a comprises an ink jet scheme printing mechanism. In the present embodiment, the print executing unit 160a is a monochrome printing mechanism that executes printing using one color of ink (in the present embodiment, black (K)). An ink cartridge 200a is mounted in the ink supplying unit 170a. The ink supplying unit 170a supplies the ink from the ink cartridge 200a to the print executing unit 160a. Below, ink cartridge may be termed "CTG (Cartridge)".

The memory 134 further stores a printer name "Pa", a model name "Ma", and ink information 140a. The printer name "Pa" is a name assigned to the printer 100a. The model name "Ma" is a name indicating a model of the printer 100a. The ink information 140a is information related to a remaining ink amount in the printer 100a, and includes a number of total sheets TOa, a number of tank sheets TAa, and a number of remaining sheets REa. Contents of the ink information 140a will be described later.

In FIG. 2, some components (e.g., operation unit, display unit etc.) of the other printers 100b to 100d are not shown. The printer 100b comprises a same configuration as the printer 100a. The printer 100b comprises a print executing unit 160b, an ink supplying unit 170b in which a CTG 200b is mounted, and a memory in a controller (reference number omitted). The memory stores a printer name "Pb", a model name "Mb", and ink information 140b. As with the ink information 140a of the printer 100a, the ink information 140b includes a number of total sheets TOb, a number of tank sheets TAb, and a number of remaining sheets REb.

The printers 100c, 100d each comprise the same configuration as the printer 100a except for respectively comprising ink supplying units 170c, 170d different from the ink supplying unit 170a of the printer 100a. The printer 100c comprises a print executing unit 160c, an ink supplying unit 170c in which a CTG 200c is mounted, and a memory in a controller (reference number omitted). The memory stores a printer name "Pc", a model name "Mc", and ink information 140c. The ink information 140c includes a number of total sheets TOc, and a number of remaining sheets REc, but does not include a number of tank sheets. Further, the printer 100d comprises a print executing unit 160d, an ink supplying unit 170d in which a CTG 200d is mounted, and a memory in a controller (reference number omitted). The memory stores a printer name "Pd", a model name "Md", and ink information 140d. The ink information 140d includes a number of total sheets TOd, and a number of remaining sheets REd, but does not include a number of tank sheets.

Figure 3A:
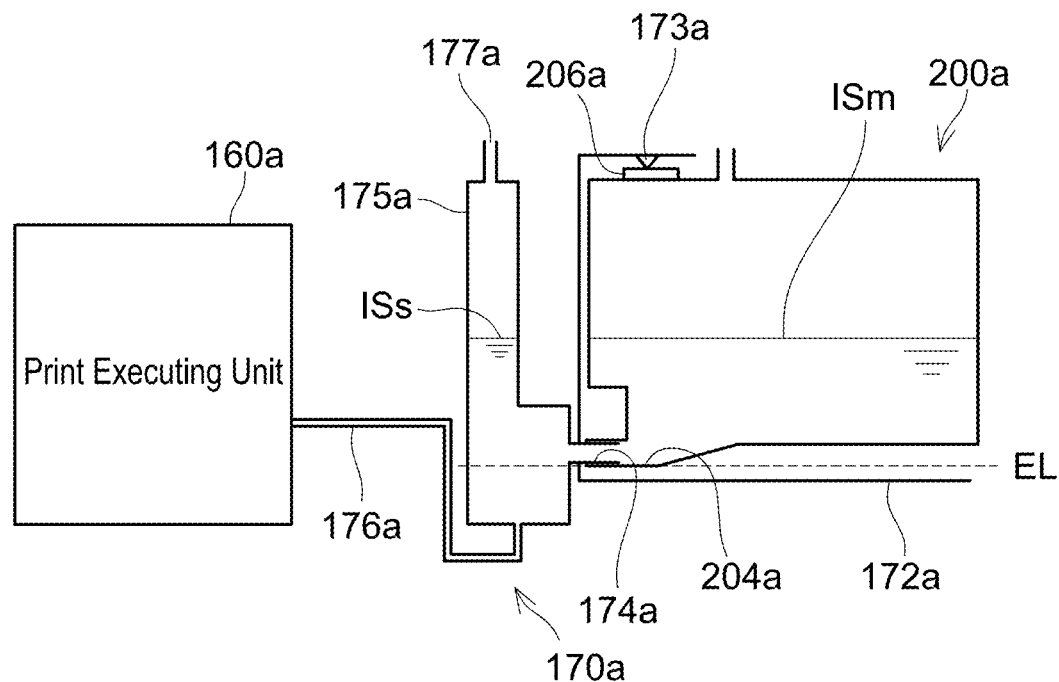
FIGS. 3A and 3B each shows a configuration of an ink supplying unit of a sub-tank model printer.
Figure 3B:
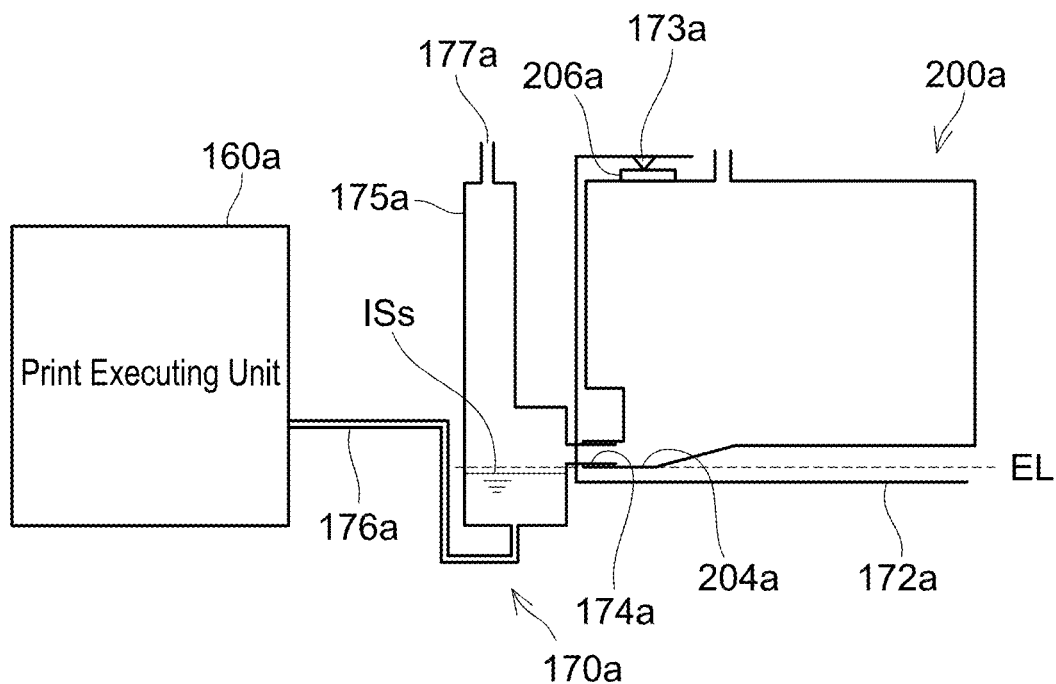

(Configuration of Ink Supplying Unit 170a of Printer 100a; FIG. 3A and FIG. 3B)

Next, a configuration of the ink supplying unit 170a of the printer 100a will be described with reference to FIG. 3A and FIG. 3B. As shown in FIG. 3A, the ink supplying unit 170a comprises an installment part 172a, an ink supply port 174a, a sub-tank 175a, and an ink flow path 176a.

The installment part 172a is a holder to which the CTG 200a is removably mounted. The ink supply port 174a is connected to an ink outlet port 204a of the CTG 200a mounted on the installment part 172a. The ink outlet port 204a is provided near a bottom surface of the CTG 200a. The sub-tank 175a stores ink supplied from the CTG 200a to the print executing unit 160a. The sub-tank 175a comprises a communication port 177a provided at an upper surface of the sub-tank 175a. The communication port 177a communicates between an interior and an exterior of the sub-tank 175a. One end of the ink flow path 176a is connected with the sub-tank 175a at a bottom surface of the sub-tank 175a. Another end of the ink flow path 176a is connected with the print executing unit 160a.

Since the ink supplying unit 170a comprises the above configuration, ink within the CTG 200a is supplied to the sub-tank 175a via the ink outlet port 204a and the ink supply port 174a. Then, the ink within the sub-tank 175a is supplied to the print executing unit 160a via the ink flow path 176a. Below, a printer (e.g., 100a) comprising this type of sub-tank (e.g., 175a) is called a "sub-tank model printer". Further, a printer not comprising a sub-tank is called a "cartridge model (i.e., CTG model) printer".

When a new CTG 200a is mounted in the installment part 172a, a part of the ink in the CTG 200a moves into the sub-tank 175a. Then, a height of a liquid level ISm of the ink in the CTG 200a matches a height of a liquid level ISs of the ink in the sub-tank 175a (see FIG. 3A). Thereafter, when ink is consumed by printing being executed by the print executing unit 160a, the liquid levels ISm, ISs fall while the liquid levels ISm, ISs maintain a matching height. Then, when the liquid levels ISm, ISs reach a position EL (hereinbelow termed "empty level EL") at a lower end of the CTG 200a, the ink in the CTG 200a reaches a non-remaining state (see FIG. 3B). Here, the ink in the CTG 200a being in the non-remaining state means a state in which there is no longer movement of ink from the CTG 200a to the sub-tank 175a, and includes a state in which some ink adheres to an inner surface of the CTG 200a, in the sub-tank model printer 100a, the CTG 200a can be replaced when the ink in the CTG 200a is in the non-remaining state, therefore ink is not wasted.

In a case where ink is remaining in the sub-tank 175a although ink is not remaining in the CTG 200a, the print executing unit 160a can continue printing. Then, when the ink in the sub-tank 175a reaches a non-remaining state without the CTG 200a being replaced, the printer 100a shifts from a printable state to an unprintable state.

Further, the installment part 172a comprises a contact point 173a that makes contact with an IC chip 206a of the CTG 200a. The CPU 132 of the printer 100a is able to read information in the IC chip 206a via the contact point 173a. This information includes the number of total sheets TOa. The number of total sheets TOa is a number of sheets of print material that can be printed using the ink amount stored in a new CTG 200a (hereinbelow termed "initial amount"). The number of total sheets TOa is obtained by dividing the initial amount by a unit ink amount. The unit ink amount is an average ink amount used for printing one sheet of print material.

Here, the ink amount in the sub-tank 175a When shifting from the state of FIG. 3A to the state of FIG. 3B is called "a boundary ink amount". That is, the boundary ink amount is the ink amount in the sub-tank 175a when the liquid level ISm of the ink in the CTG 200a reaches the empty level EL. In other words, the boundary ink amount is a maximum ink amount that can be stored in the sub-tank 175a when the ink in the CTG 200a is zero. Further, hereinbelow, the number of sheets of print material that can be printed using the boundary ink amount is called "a number of tank sheets". The boundary ink amount and the number of tank sheets depend on structure and size of the sub-tank. The number of tank sheets TAa of the printer 100a is obtained by dividing the boundary ink amount of the printer 100a by the unit ink amount.

As described above, upon reading the number of total sheets TOa from the CTG 200a, the CPU 132 of the printer 100a stores the number of total sheets TOa in the memory 134 (see FIG. 2). Further, the memory 134 of the printer 100a stores the number of tank sheets TAa in advance (see FIG. 2). Further, the number of remaining sheets REa stored in the memory 134 (see FIG. 2) is the number of sheets of print material that can be printed using the ink remaining in the CTG 200a and the sub-tank 175a, and is obtained by subtracting a cumulative number of printed sheets from the number of total sheets TOa. The cumulative number of printed sheets is the number of sheets of print material for which printing was executed after replacement of the CTG 200a. Each time printing is executed by the print executing unit 160a, the CPU 132 calculates a new number of remaining sheets REa by subtracting the cumulative number of printed sheets from the number of total sheets TOa, and stores the new number of remaining sheets REa in the memory 134 instead of the old number of remaining sheets REa.

(Configuration of Ink Supplying Unit 170b of Printer 100b)

The printer 100b is, similar to the printer 100a, a sub-tank model printer. The ink supplying unit 170b of the printer 100b is however different from the ink supplying unit 170a of the printer 100a. Specifically, a size of an interior space of a sub-tank (not shown) of the ink supplying unit 170b is different from a size of an interior space of the sub-tank 175a of the ink supplying unit 170a. Accordingly, the boundary tank amount of the ink supplying unit 170b is different from the boundary tank amount of the ink supplying unit 170a. In the present embodiment, the boundary tank amount of the ink supplying unit 170b is smaller than the boundary tank amount of the ink supplying unit 170a. Due to this, the number of tank sheets TAb of the printer 100b (see FIG. 2) is less than the number of tank sheets TAa of the printer 100a. Further, a size of an interior space of the CTG 200b that can be mounted in the ink supplying unit 170b is different from a size of an interior space of the CTG 200a that can be mounted in the ink supplying unit 170a. In the present embodiment, the initial amount of ink in the CTG 200b is smaller than the initial amount of ink in the CTG 200a. Due to this, the total number of sheets TOb (see FIG. 2) of the printer 100b is less than the total number of sheets TOa of the printer 100a. Thus, in the present embodiment, there are plural types of sub-tank models of printers 100a, 100b. Alternatively, in a variant, there may be only one type of sub-tank model printer(s).

Figure 4A:
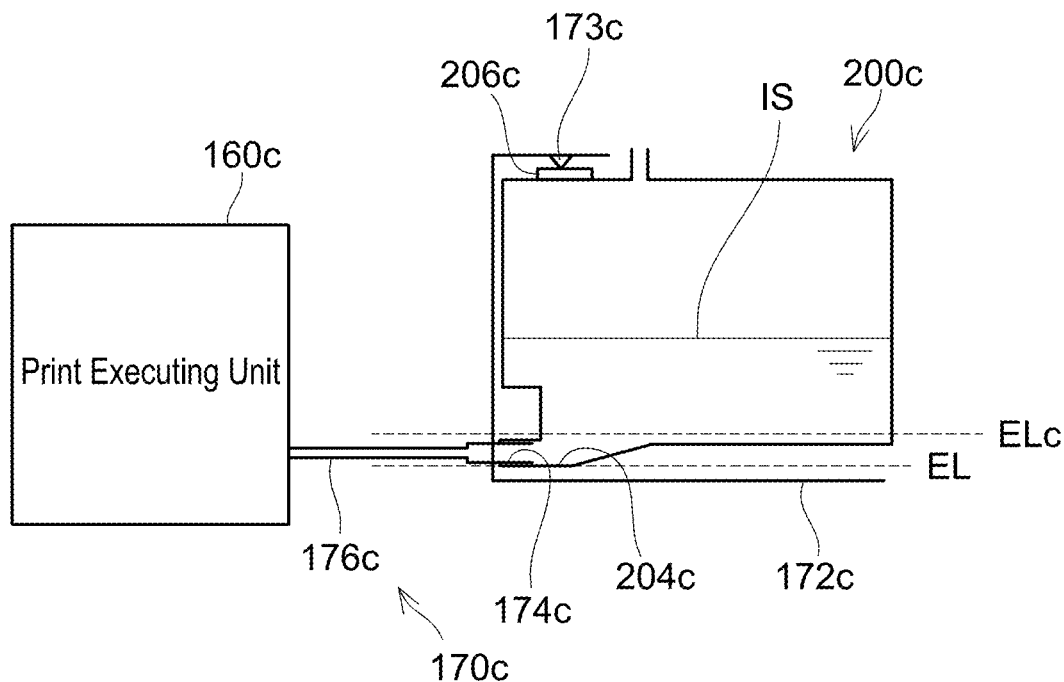
FIGS. 4A and 4B each shows a configuration of an ink supplying unit of a cartridge model printer.
Figure 4B:
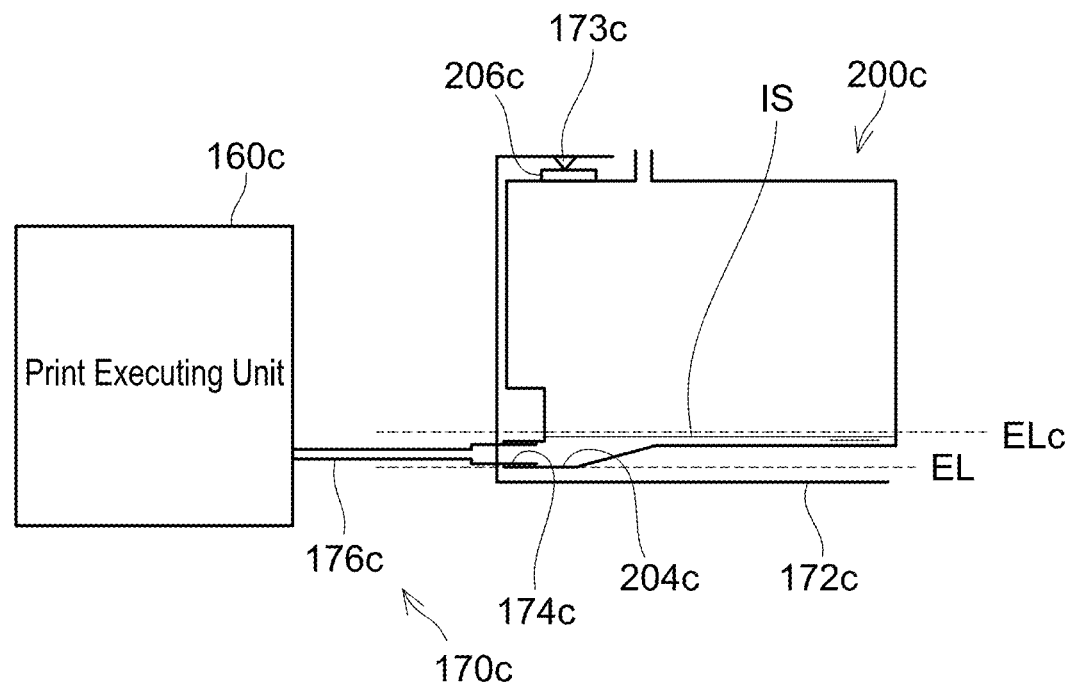

(Configuration of Ink Supplying Unit 170c of Printer 100c; FIG. 4A and FIG. 4B)

Next, a configuration of the ink supplying unit 170c of the printer 100c will be described with reference to FIG. 4A and FIG. 4B. The printer 100c is a CTG model printer not comprising a sub-tank. As shown in FIG. 4A, the ink supplying unit 170c comprises an installment part 172c, an ink supply port 174c, and an ink flow path 176c.

The installment part 172c, the ink supply port 174c are respectively the same as the installment part 172a, the ink supply port 174a of the printer 100a. (see FIG. 3A). Further, a contact point 173c is the sane as the contact point 173a. Since a sub-tank does not exist, one end of the ink flow path 176c is connected with the ink supply port 174c. Another end of the ink flow path 176c is connected with the print executing unit 160c.

A size of an interior space of the CTG 200c that can be mounted in the ink supplying unit 170c is different from a size of an interior space of the CTG 200a. Consequently, an initial amount of ink in the CTG 200c is different from the initial amount of ink in the CTG 200a. For this reason, the number of total sheets TOc (see FIG. 2) of the printer 100c is different from the number of total sheets TOa of the printer 100a. However, in a variant, the number of total sheets TOc may be the same as the number of total sheets TOa. Since a sub-tank is not provided in the printer 100c, a number of tank sheets does not exist in the printer 100c. An ink outlet port 204c, an IC chip 206c of the CTG 200c are respectively the same as the ink outlet port 204a, the IC chip 206a of the CTG 200a (see FIG. 3A).

A sub-tank is not provided in the CTG model printer 100c. For this reason, the printer 100c shifts from a printable state to an unprintable state before the ink in the CTG 200c runs out. A reason therefore is as follows. That is, when the remaining amount of ink in the CTG 200c becomes low, air can enter the ink flow path 176c connected to the print executing unit 160c, and consequently air can be mixed into the ink supplied to the print executing unit 160c. In this case, the print executing unit 160c cannot execute printing properly. For this reason, a boundary between a remaining amount at which air does not mix with the ink and a remaining amount at which air can mix with the ink is set as an empty level ELc. That is, the empty level ELc is set to a position higher than the empty level EL at which the remaining ink amount in the CTG 200c reaches zero. FIG. 4B shows a state in which a liquid level IS of the ink in the CTG 200c has reached the empty level ELc. When this state is reached, the printer 100c shifts from the printable state to the unprintable state. When the printer 100e has shifted to the unprintable state, it is necessary to replace the CTG 200c in order to execute printing.

(Configuration of Ink Supplying Unit 170d of Printer 100d)

The printer 100d is, similar to the printer 100c, a CTG model printer. The ink supplying unit 170d of the printer 100d is however different from the ink supplying unit 170c of the printer 100c. Specifically, a size of an interior space of the CTG 200d that can be mounted in the ink supplying unit 170d is different from a size of an interior space of the CTG 200c that can be mounted in the ink-supplying unit 170c. In the present embodiment, the initial amount of ink in the CTG 200d is smaller than the initial amount of ink in the CTG 200c. Due to this, the total number of sheets TOd (see FIG. 2) of the printer 100d is less than the total number of sheets TOc of the printer 100e. Thus, in the present embodiment, there are plural types of CTG model printers 100e, 100d. Alternatively, in a variant, there may be only one type of CTG model printer(s).

As described above, in the present embodiment, the sub-tank Model printers 100a, 100b and the CTG model printers 100c, 100d exist as management target printers of the management server 10. Therefore, when displaying each remaining amount object indicating the remaining ink amount in each of the printers 100a etc., the management server 10 displays each remaining amount object in a display manner corresponding to the model. Convenience for an administrator of the printers 100a to 100d (i.e., user(s) of the management server 10) is thereby improved in order to realize this, the management server 10 uses the management DB 40, described below, to execute the processes of FIG. 6, etc., to be described later.

(Contents of Information in Management DB 40; FIG. 5)

Next, information in the management DB 40 of the management server 10 will be described with reference to FIG. 5. The management DB 40 includes one or more pieces of management information corresponding to one or more printers. Each of the one or more pieces of management information is information in Which printer name, model name, ink supply model, three types of numbers of sheets, and three types of remaining rates are associated with each other. The three types of numbers of sheets includes a number of total sheets TO, a number of tank sheets TA, and a number of remaining sheets RE. The three types of remaining rates include a CTG remaining rate, a tank remaining rate, and a total remaining rate.

The printer name, the model name, the three types of numbers of sheets are stored in the management DB 40 by being acquired from each of the printers 100a to 100d. The ink supply model is information indicating either sub-tank model or CTG model. Information indicating the sub-tank model is described in an ink supply model field in a case where the number of tank sheets is acquired from the printers 100a, 100b, and information indicating the CTG model is described in the ink supply model field in a case where the number of tank sheets is not acquired from the printers 100c, 100d. Since the number of tank sheets does not exist in CTG model printers, a field of the number of tank sheets is blank. Further, the three types of remaining rates are described in the management DB 40 by being calculated based on the three types of numbers of sheets.

The CTG remaining rate is a remaining rate of ink remaining in a CTG of a printer. In the sub-tank model, in a case where number of remaining sheets RE> number of tank sheets TA, i.e., in a case where ink is remaining in the CTG, the CTG remaining rate is calculated by a formula "100×(number of remaining sheets RE−number of tank sheets TA)/(number of total sheets TO−number of tank sheets TA)". On the other hand, in a case where the number of remaining sheets RE≤number of tank sheets TA, i.e., in a case where ink is not remaining in the CTG, the CTG remaining rate is 0%. Further, in the CTG model, the CTG remaining rate is calculated by a formula "100×number of remaining Sheets RE/number of total sheets TO".

The tank remaining rate is a remaining rate of ink remaining in the sub-tank in a sub-tank model printer. In a case where number of remaining sheets RE>number of tank sheets TA i.e., in a case where ink is remaining in the CTG, the tank remaining rate is 100%. On the other hand, in a case where number of remaining sheets RE≤number of tank sheets TA, i.e., in a case where ink is not remaining in the CTG, the tank remaining rate is calculated by a formula "100×number of remaining sheets RE/number of tank sheets TA". Since a sub-tank does not exist in a CTG model printer, the tank remaining rate field is blank.

The total remaining rate is a remaining rate of ink remaining in total in a printer. In both of the sub-tank model printer and CTG model printer, the total remaining rate is calculated by a formula "100×number of remaining sheets RE/total number of sheets TO".

Figure 6:
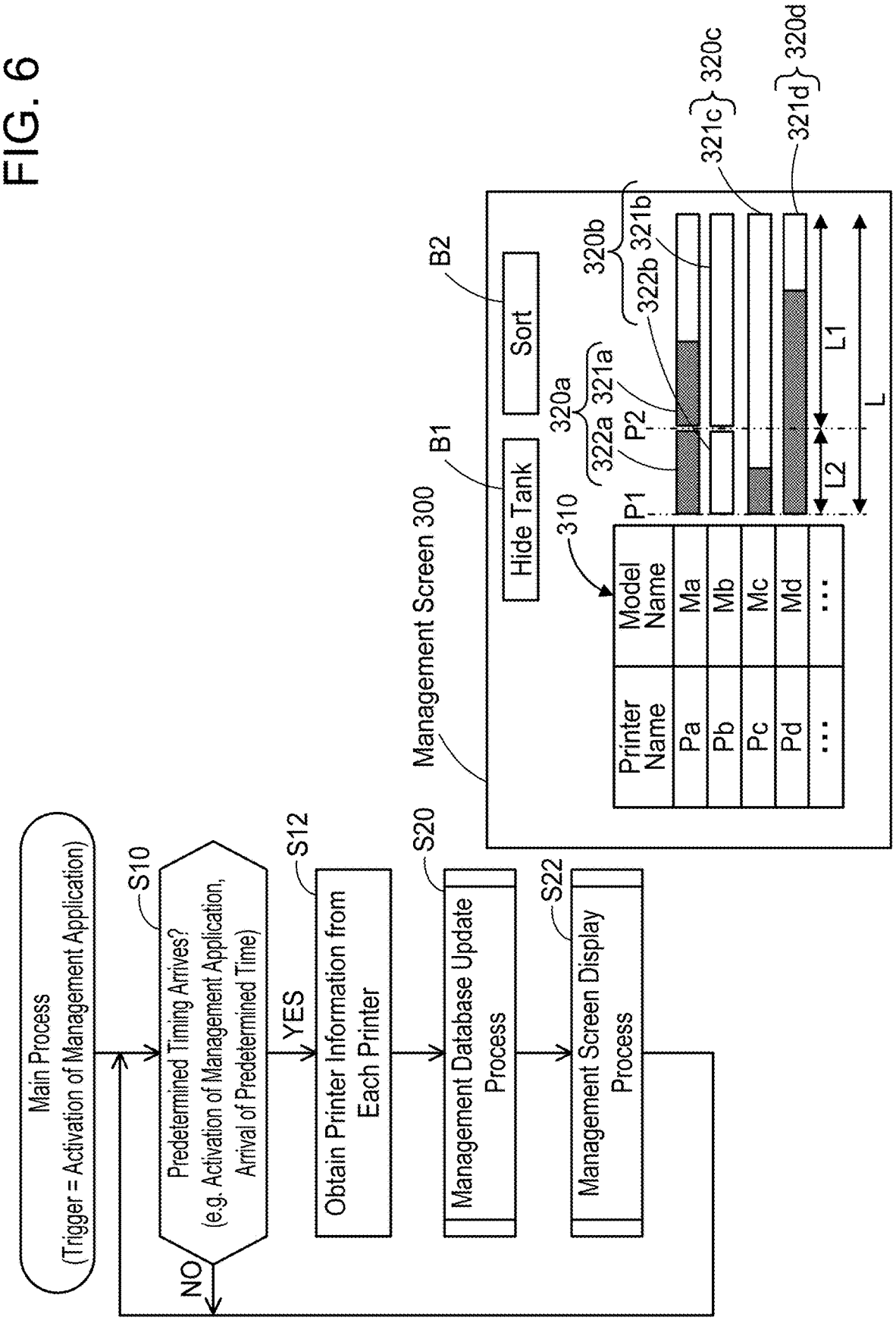
FIG. 6 shows a flowchart of a main process.

(Main Process; FIG. 6)

Next, contents of a main process executed by the CPU 32 of the management server 10 according to the management application 38 will be described with reference to FIG. 6. The CPU 32 starts a process of FIG. 6 when the management application 38 is activated by the administrator.

In S10, the CPU 32 monitors arrival of a predetermined timing. In the present embodiment, predetermined timing includes a timing at which the management application 38 is activated, and timing(s) at which a predetermined time (e.g., times coming once every hour) arrives. In a variant, the predetermined timing may be a timing at which a predetermined instruction is given by the administrator. In a case where the predetermined timing arrives, the CPU 32 determines YES in S10, and proceeds to S12.

In S12, the CPU 32 acquires printer information from each of the printers 100a to 100d connected to the LAN 6. The respective printer information includes the printer name, model name, and ink information. Specifically, the CPU 32 sends a request signal requesting sending of the printer information by broadcast to the LAN 6. Thereby, the CPU 32 acquires the printer information by receiving the printer information from each of the printers 100a to 100d as a response to the request signal.

Figure 7:
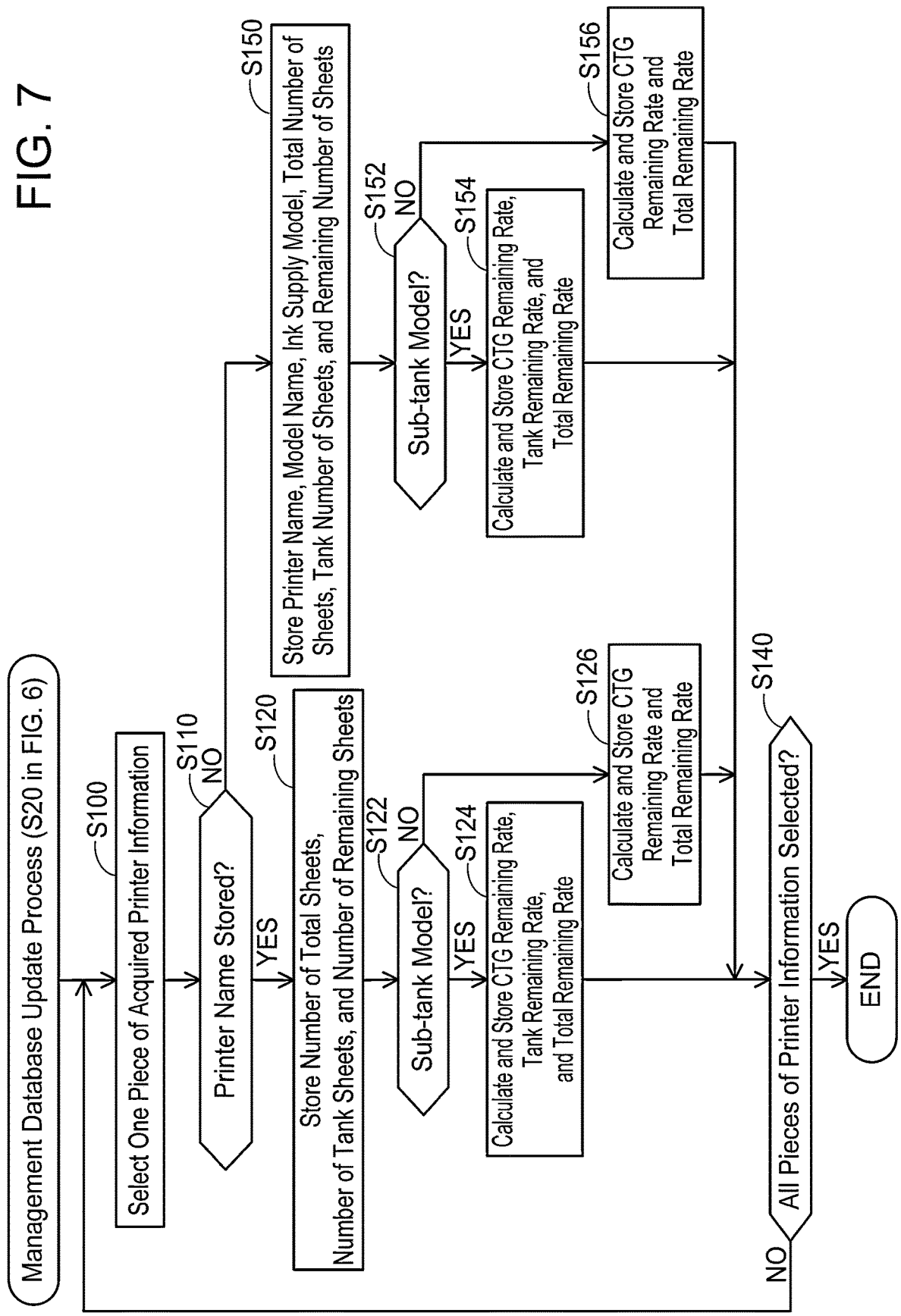
FIG. 7 shows a flowchart of a management database update process.

In S20, the CPU 32 executes a management database update process (see FIG. 7). This process is a process of updating the information in the management DB 40 using the pieces of printer information acquired in S12.

Figure 8:
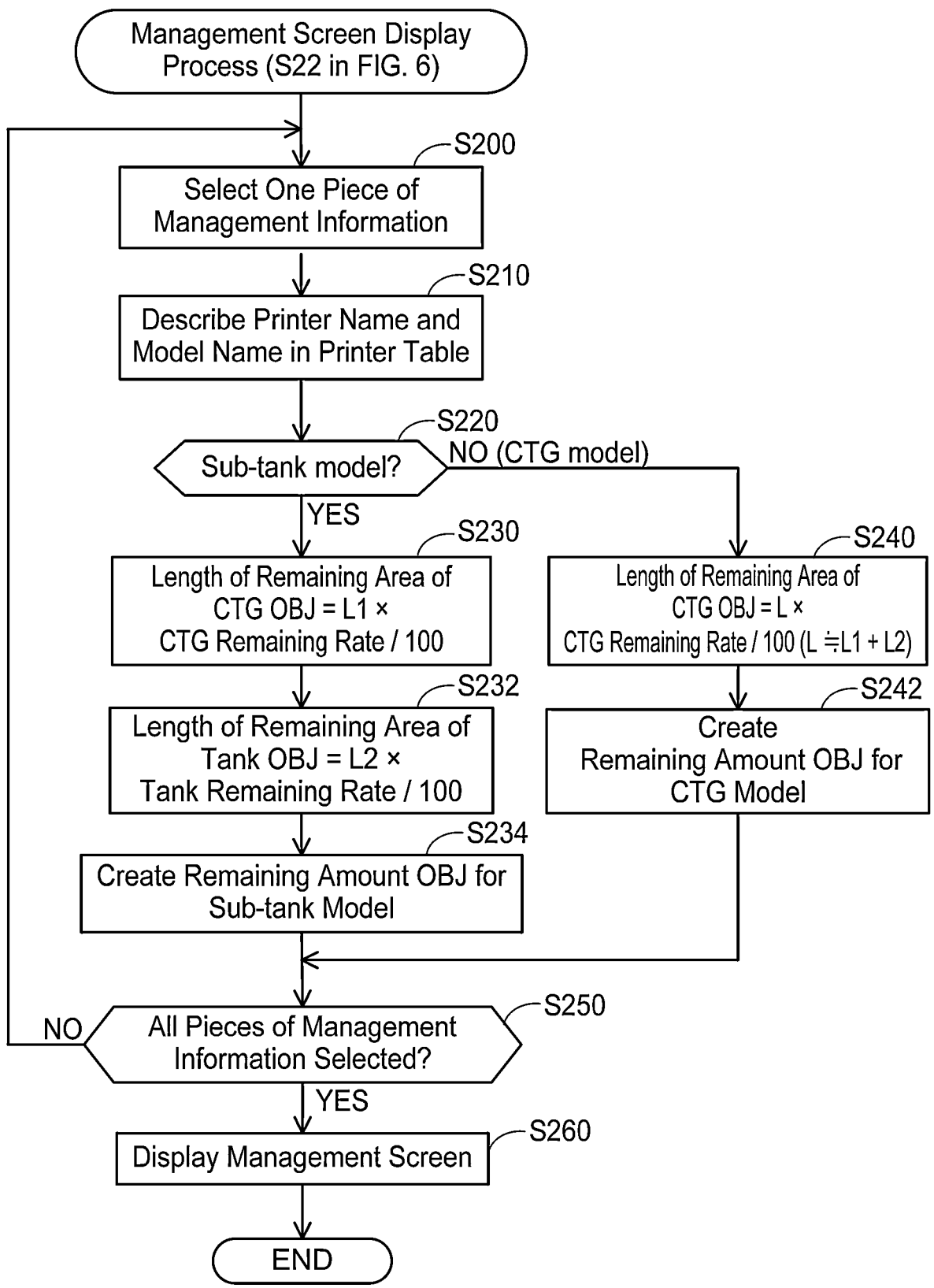
FIG. 8 shows a flowchart of a management screen display process.

In S22, the CPU 32 executes a management screen display process (see FIG. 8). This process is a process for displaying a management screen on the display unit 14 using the information in the management DB 40 which was updated in S20. FIG. 6 shows an example of a management screen 300. The management screen 300 includes a printer table 310, remaining amount objects 320a to 320d, and two buttons B1 and B2. Below, object may be termed "OBJ (Object)".

In the printer table 310, the printer name and the model name are associated with each other (i.e., are arranged in a straight line). The remaining amount OBJs 320a to 320d are associated with the printer names and the model names (i.e., are arranged in straight lines), and indicate the remaining ink amount in the printer having the associated printer name. For example, the remaining amount OBJ 320a associated with the printer name "Pa" indicates the remaining ink amount in the printer 100a having the printer name "Pa".

The remaining amount OBJ 320a corresponding to the sub-tank model printer 100a (i.e., printer name "Pa") includes a CTG OBJ 321a indicating the remaining ink amount in the CTG 200a, and a tank OBJ 322a indicating the remaining ink amount in the sub-tank 175a. Similarly, a remaining amount OBJ 320b corresponding to the sub-tank model printer 100b (i.e., printer name "Pb") includes a CTG OBJ 321b and a tank OBJ 322b. Further, a remaining amount OBJ 320c corresponding to the CTG model printer 100c (i.e., printer name "Pc") includes a CTG OBJ 321c. Since the printer 100c is a CTG model, the remaining amount OBJ 320c does not include a tank OBJ. Similarly, a remaining amount OBJ 320d corresponding to the CTG model printer 100d (i.e., printer name "Pd") includes a CTG OBJ 321d, and does not include a tank OBJ. The aforementioned OBJs 321a to 321d, 322a, 322b have a band shape extending in a straight line along a right-left direction (in other words, a bar shape).

The button B1 is a button for hiding the respective tank OBJs 322a, 322b corresponding to the sub-tank model printers 100a, 100b. The button B2 is a button for sorting an order of the respective remaining amount OBJs 320a to 320d. When S22 ends, the process returns to S10.

(Management Database Update Process; FIG. 7)

Next, contents of the management database update process executed in S20 of FIG. 6 will be described with reference to FIG. 7. In S100, the CPU 32 selects one piece of printer information from among the one or more pieces of printer information which were acquired in S12 of FIG. 6. Below, the piece of printer information selected here is called "selected printer information".

In S110, the CPU 32 determines whether the printer name included in the selected printer information (hereinbelow termed "selected printer name") has been stored in the management DB 40. The CPU 32 proceeds to S120 in case of determining that the selected printer name has been stored (YES in S110), and proceeds to S150 in case of determining that the selected printer name has not been stored (NC) in S110).

In S120, the CPU 32 stores each of the number of total sheets, the number of tank sheets, and the number of remaining sheets included in the selected printer information in respective fields of the number of total sheets, the number of tank sheets, and the number of remaining sheets included in the management information that includes the selected printer name (hereinbelow termed "selected management information").

In S122, the CPU 32 determines whether the ink supply model included in the selected management information is the sub-tank model. The CPU 32 proceeds to S124 in case of determining that the ink supply model is the sub-tank model (YES in S122), and proceeds to S126 in case of determining that the ink supply model is the CTG model (NO in S122).

In S124, the CPU 32 uses the number of total sheets, the number of tank sheets, and the number of remaining sheets included in the selected management information to calculate the CTG remaining rate, the tank remaining rate and the total remaining rate (see formulas of FIG. 5). Then, the CPU 32 stores each of the calculated CTG remaining rate, the calculated tank remaining rate and the calculated total remaining rate in respective fields of the CTG remaining rate, the tank remaining rate, and the total remaining rate included in the selected management information. Each of the remaining rates stored hereof is a value with its decimals rounded off to the nearest whole number. This applies as well to the following S126, S154, and S156.

In S126, the CPU 32 uses the number of total Sheets and the number of remaining sheets included in the selected management information to calculate the CTG remaining rate and the total remaining rate (see the formula of FIG. 5). Then, the CPU 32 stores the calculated CTG remaining rate and the calculated total remaining rate respectively in the CTG remaining rate field and the total remaining rate field included in the selected management information. When S124 or S126 ends, the process proceeds to S140.

Further, in S150, the CPU 32 stores new management information in the management DB 40. Specifically, the CPU 32 firstly stores the printer name and the model name included in the selected printer information. Further, the CPU 32 stores the sub-tank model as the ink supply model in a case where the selected printer information includes the number of tank sheets, and stores the CTG model as the ink supply model in a case where the selected printer information does not include the number of tank sheets. Next, in the case where the ink supply model is the sub-tank model, the CPU 32 stores the number of total sheets, the number of tank sheets, and the number of remaining sheets. On the other hand, in the case where the ink supply model is the CTG model, the CPU 32 stores the number of total sheets and the number of remaining sheets.

S152 to S156 are the same as S122 to S126. When S154 or S156 ends, the process proceeds to S140.

In S140, the CPU 32 determines whether all the pieces of printer information acquired in S12 of FIG. 6 have been selected in S100. In case of determining that all the pieces of printer information have been selected (YES in S140), the CPU 32 ends the process of FIG. 7. On the other hand, in case of determining that not all the pieces of printer information have been selected (NO in S140), the CPU 32 returns to S100, and selects another piece of the printer information.

(Management Screen Display Process; FIG. 8)

Next, contents of the management screen display process executed in S22 of FIG. 6 will be described with reference to FIG. 8. In S200, the CPU 32 selects one piece of management information from among the one or more pieces of management information in the management DB 40. Below, the piece of management information selected here is called "selected management information".

In S210, the CPU 32 describes the printer name and the model name included in the selected management information in association with each other in the printer table 310 (see FIG. 6).

In S220, the CPU 32 determines whether the ink supply model included in the selected management information is the sub-tank model. The CPU 32 proceeds to S230 in case of determining that the ink supply model is the sub-tank model (YES in S220), and proceeds to S240 in case of determining that the ink supply model is the CTG model (NO in S220).

As described above, a remaining amount OBJ (e.g., 320a of FIG. 6) corresponding to the sub-tank model printer includes a CTG OBJ (e.g., 321a) and a tank OBJ (e.g., 322a). Here, in the CTG OBJ and the tank OBJ, a filled area indicates that ink is remaining, and an unfilled area indicates that ink is not remaining. Below, the former area is called "remaining area".

In S230, the CPU 32 calculates a length of the remaining area of the CTG OBJ included in the remaining amount OBJ corresponding to the sub-tank model printer. Specifically, the CPU 32 calculates the length of the remaining area of the CTG OBJ using the formula "length L1×CTG remaining rate/100". Here, the length L1 in the formula is a length predetermined as the length of the CTG OBJ. Further, the CTG remaining rate in the formula is the CTG remaining rate included in the selected management information and rounded off to the nearest ten.

In S232, the CPU 32 calculates the length of the remaining area of the tank OBJ included in the remaining amount OBJ corresponding to the sub-tank model printer. Specifically, the CPU 32 calculates the length of the remaining area of the tank OBJ using the formula "length L2×tank remaining rate/100". Here, the length. L2 in the formula is a length predetermined as the length of the tank OBJ. Further, the tank remaining rate in the formula is the tank remaining rate included in the selected management information as it is (that is, it is not rounded off to the nearest ten).

As mentioned above, in regards to each of the remaining amount OBJs corresponding to the sub-tank model printers, the length of the remaining area of the CTG OBJ is calculated using the CTG remaining rate rounded off to the nearest ten (S230) while the length of the remaining area of the tank OBJ is calculated using the tank remaining rate not rounded off to the nearest ten (S232). Accordingly, the length of the remaining rate of the CTG OBJ changes in units of ten percent and the length of the remaining area of the tank OBJ changes in units of one percent. In other words, a resolution of the remaining area of the tank OBJ is higher than a resolution of the remaining area of the CTG OBJ. Due to this, the administrator can acknowledge the tank remaining rate more precisely than the CTG remaining rate. Thus, after the ink remaining amount in a CTG has reached zero, the administrator can grasp a situation correctly until the ink remaining rate in the corresponding sub-tank becomes zero (that is, until the printer becomes unable to execute printing). As a result of this, the administrator can replace the CTG with a new one before the ink remaining rate in the sub-tank becomes zero. Alternatively, in a variant, in S230, the CTG remaining rate may not be rounded off to the nearest ten. That is, the resolution of the remaining area of the tank OBJ may be equal to the resolution of the remaining area of the CTG OBJ.

In S234, the CPU 32 creates the remaining amount OBJ corresponding to each sub-tank model printer. Specifically, the CPU 32 first fills an area having the length which was calculated in S230 in a band-shaped rectangle OBJ having the length L1. In particular, in the present embodiment, this is filled from a left end toward a right side of the rectangle OBJ. Thereby, the CTG OBJ including the remaining area having the length calculated in S230 is completed. Further, the CPU 32 fills an area having the length calculated in S232 in a band-shaped rectangle OBJ having the length L2. In particular, in the present embodiment, this is filled from the left end toward the right side of the rectangle OBJ. Thereby, the tank OBJ including the remaining area having the length calculated in S232 is completed. Then, the CPU 32 positions the CTG OBJ on the right side and positions the tank OBJ on the left side such that a small gap having a predetermined length is formed between the CTG OBJ and the tank OBJ. As shown in FIG. 6, the gap is located on a virtual straight line P2 extending along an up-down direction. Here, the printer name and the model name which were described in S210, the CTG OBJ, and the tank OBJ are arranged on a straight line extending in a left-right direction. Thereby, the remaining amount OBJ corresponding to the sub-tank model printer is completed. Since there is a gap in this remaining amount OBJ (i.e., since the CTG OBJ and the tank OW are displayed separately), the administrator can easily acknowledge that this remaining amount OBJ indicates the remaining ink amount in a sub-tank model printer.

Further, in S240, the CPU 32 calculates the length of the remaining area of the CTG OBJ included in the remaining amount OBJ corresponding to the CTG model printer. Specifically, the CPU 32 calculates the length of the remaining area of the CTG OBJ using the formula "length L×CTG remaining rate/100". Here, the length L in the formula is a length predetermined as the length of the remaining amount OBJ (i.e., the length of the CTG OBJ corresponding to the CTG model). The length L is approximately equal to a sum of the length L1 and the length L2 used in S230 and S232. Specifically, the length L is a value obtained by subtracting a length of the aforementioned gap from the sum of the length L1 and the length L2. Further, the CTG remaining rate in the formula is the CTG remaining rate included in the selected management information and rounded off to the nearest ten. Alternatively, in a variant, the CTG remaining rate may not be rounded off to the nearest ten.

In S242, the CPU 32 creates the remaining amount OBJ corresponding to each CTG model printer. Specifically, the CPU 32 first fills an area having the length which was calculated in S240 in a band-shaped rectangle OBJ having the length L. In particular, in the present embodiment, this is filled from the left end toward the right side of the rectangle OBJ. Thereby, the CTG OBJ including the remaining area having the length calculated in S240 is completed. Here, the printer name and the model name which were described in S210, and the CTG OBJ are arranged on a straight line extending in the left-right direction. Thereby, the remaining amount OBJ corresponding to the CTG model printer is completed. Since a gap does not exist in this remaining amount OBJ (i.e., since the tank OBJ does not exist), the administrator can easily acknowledge that this remaining amount OBJ indicates the remaining ink amount in a CTG model printer.

In S234 and S242, the CPU 32 arranges the respective remaining amount OBJs such that the left ends of the remaining amount OBJs are located on a virtual straight line P1 extending along the up-down direction. As a result of this, in the left-right direction, the position of the tank object (e.g. left end of 322a) corresponding to the tank remaining amount being zero in the remaining amount OBJ of each sub-tank model (e.g. 320a) becomes equal to the position of the CTG object (e.g. left end of 321c) corresponding to the CTG remaining rate being zero in the remaining amount OBJ of each CTG model (e.g. 320c). Due to this, the administrator can easily recognize the ink remaining amounts in sub-tank model printers and the ink remaining amounts in CTG model printers using a common position (that is, position corresponding to unprintable remaining amount) as a reference. Thus, convenience for the administrator can be improved.

The CPU 32 creates each remaining amount object, by using the length L1, the length L2, and the aforementioned gap (that is, gap between tank OBJ and CTG OBJ) in S230 to S234, and creates each remaining amount object, by using the length L. Here, L is a SUM of L1, L2, and the aforementioned gap. Accordingly, the length of the remaining amount OBJ of each sub-tank model (e.g. 320a) in the left-right direction is equal to the length of the remaining amount OBJ of each CTG model (e.g. 320c) in the left-right direction. Due to this, the administrator can easily recognize the ink remaining amounts of the sub-tank model printers and the ink remaining amounts of the CTG model printers using the same length as a reference. Accordingly, convenience for the administrator can be improved.

As mentioned above, in the present embodiment there are two types of sub-tank model printers 100a, 100b. The size of the interior space of the sub-tank 175a of the printer 100a (see FIG. 3) and the size of the interior space of the sub-tank of the printer 100b are different from each other. As a result of this, the number of tank sheets TAa of the printer 100a and the number of tank sheets TAh of the printer 100b are different from each other. In S234, the CPU 32 creates the tank OBJs 322a, 322b (see FIG. 6) each having the length L2 respectively for the two types of sub-tank model printers 100a, 100b. Accordingly, the length of the tank OBJ 322a corresponding to the printer 100a in the left-right direction and the length of the tank OBJ 322b corresponding to the printer 100b in the left-right direction are equal to each other. Due to this, the administrator can easily recognize the ink remaining amount in the sub-tank 175a of the printer 100a and the ink remaining amount in the sub-tank of the printer 100b using the same length as a reference. Accordingly, convenience for the administrator can be improved.

Further, the size of the interior space of the CTG 200a (see FIG. 2) mounted in the printer 100a and the size of the interior space of the CTG 200b mounted in the printer 100b are different from each other. As a result of this, the total number of sheets TOa of the printer 100a and the total number of sheets TOb of the printer 100b are different from each other. In S234, the CPU 32 creates the CTG OBJs 321a, 3211 (see FIG. 6) each having the length L1 respectively for the two types of sub-tank model printers 100a, 100b. Accordingly, the length of the CTG OW 321a corresponding to the printer 100a in the left-right direction and the length of the CTG OBJ 321b corresponding to the printer 100b in the left-right direction are equal to each other. Due to this, the administrator can easily recognize the ink remaining amount in the CTG 200a of the printer 100a and the ink remaining amount in the CTG 200b of the printer 100b using the same length as a reference. Accordingly, convenience for the administrator can be improved.

As aforementioned, in the present embodiment, there are two types of CTG model printers 100c, 100d. The size of the interior space of the CTG 200c mounted in the printer 100c (see FIG. 2) and the size of the interior space of the CTG 200d mounted in the printer 100d are different from each other. As a result of this, the total number of sheets TOc of the printer 100c and the total number of sheets TOd of the printer 100d are different from each other. In S242, the CPU 32 creates the CTG OBJs 321c, 321d (see FIG. 6) each having the length L respectively for the two types of CTG model printers 100e, 100d. Accordingly, the length of the CTG OBJ 321c corresponding to the printer 100c in the left-right direction and the length of the CTG OBJ 321d corresponding to the printer 100d in the left-right direction are equal to each other. Due to this, the administrator can easily recognize the ink remaining amount in the CTG 200c of the printer 100c and the ink remaining amount in the CTG 200d of the printer 100 using the same length as a reference. Accordingly, convenience for the administrator can be improved.

In S250, the CPU 32 determines Whether all the pieces of management information in the management DB 40 have been selected in S200. The CPU 32 proceeds to S260 in case of determining that all the pieces of management information have been selected (YES in S250). On the other hand, in case of determining that not all the pieces of management information have been selected (NO in S250), the CPU 32 returns to S200, and selects other piece(s) of the management information.

In S260, the CPU 32 displays, in the display unit 14, the management screen 300 (see FIG. 6) including the printer table 310 which was created in S210, the remaining amount OBJs which were created in S232 and S242, and the two buttons B1, B2. When S260 ends, the process of FIG. 8 ends.

Figure 9:
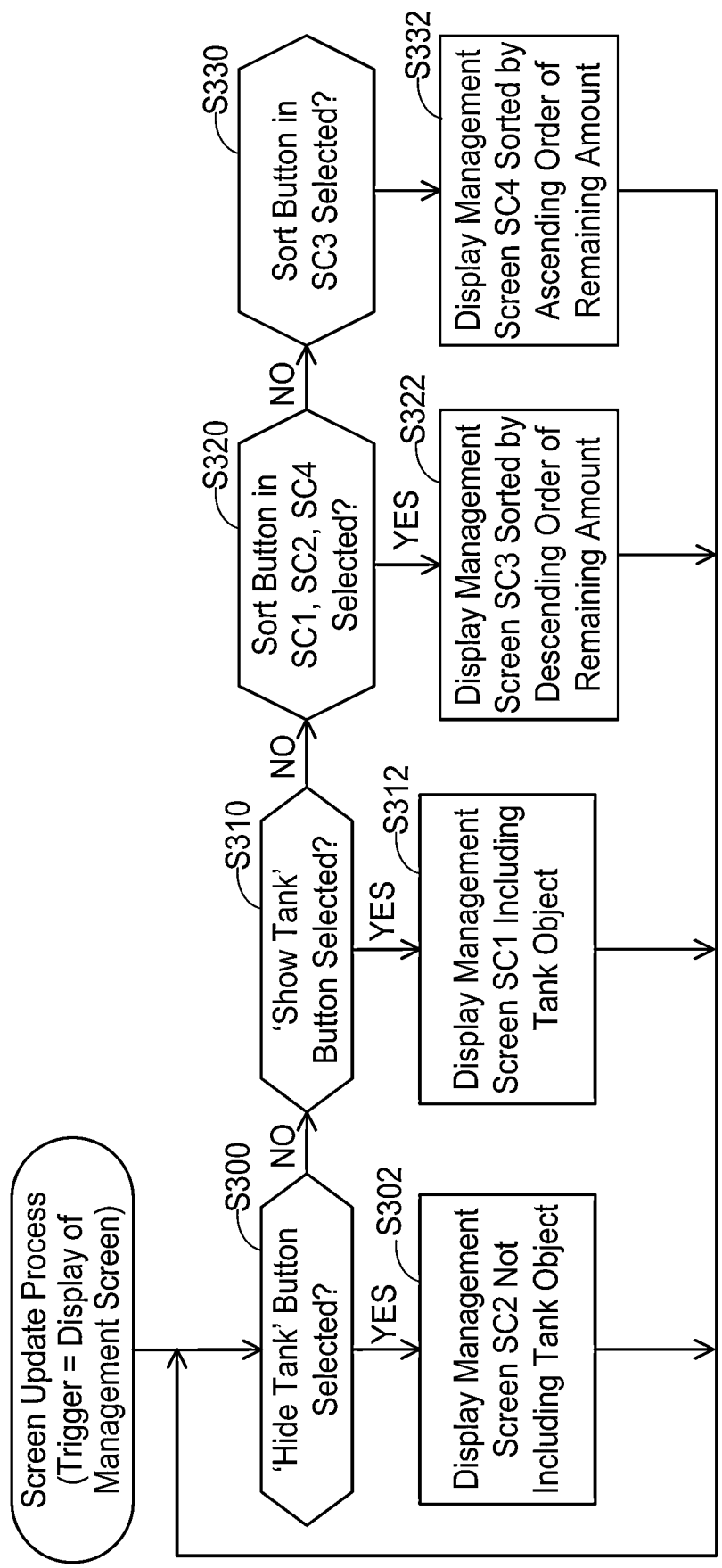
FIG. 9 shows a flowchart of a screen update process.

(Screen Update Process; FIG. 9)

Next, with reference to FIG. 9, content of a screen update processor updating a displayed content of the management screen 300 will be described. When the management screen 300 is displayed in S22 in FIG. 2 (i.e., S260 in FIG. 8), process of FIG. 9 is started.

In S300, S310, S320, and S330, the CPU 32 monitors selection of one of the buttons in the management screen 300 (e.g. B1). In a case where the button 131 indicating "Hide Tank" in the management screen 300 is selected, the CPU 32 determines YES in S300, and proceeds to S302.

Figure 10:
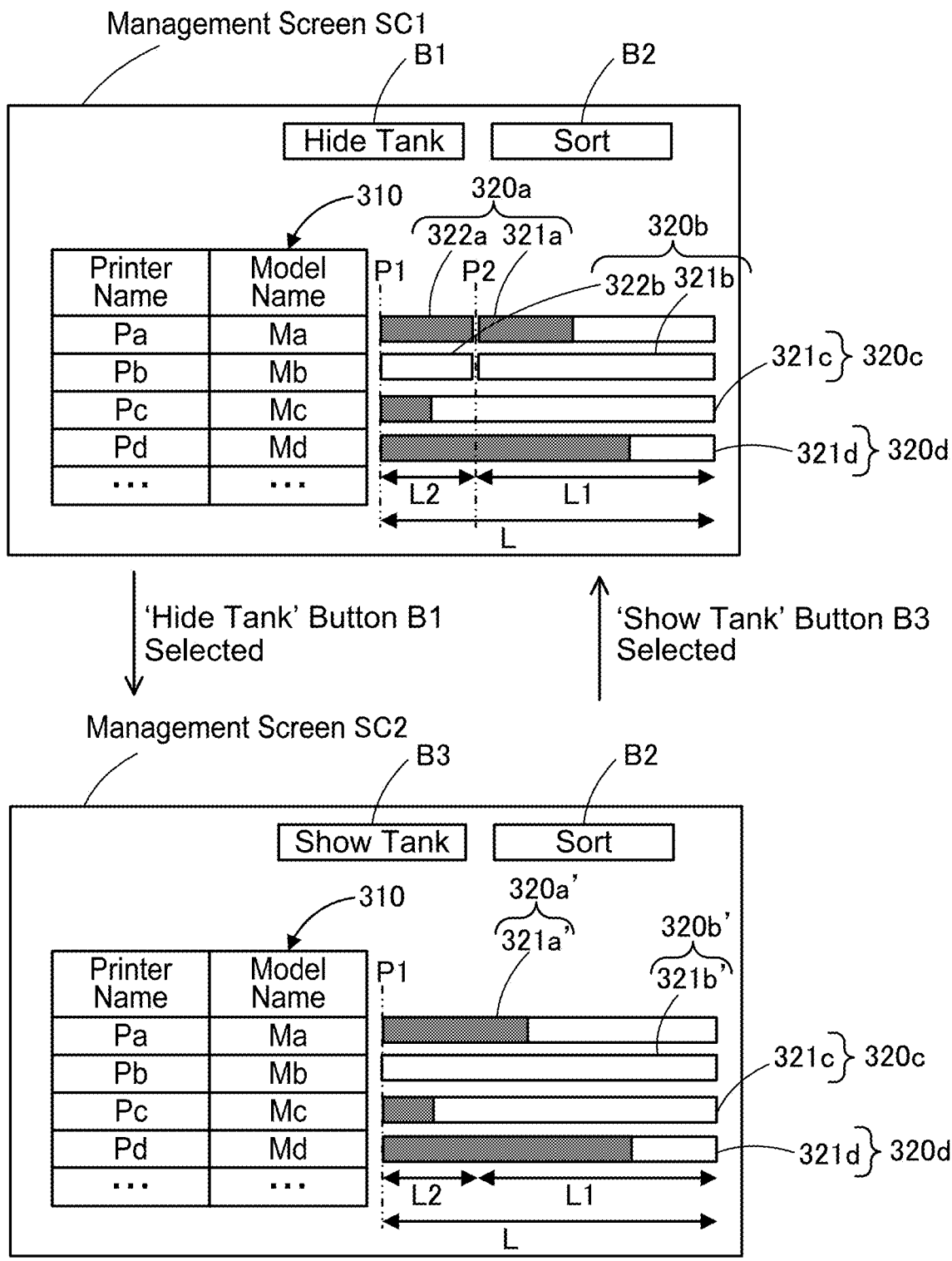
FIG. 10 shows a management screen including a tank object and a management screen not including the tank object.

In S302, the CPU 32 displays a management screen which includes alternative remaining amount OBJs instead of the remaining amount OBJs 320a, 320b corresponding to the respective sub-tank model printers 100a, 100b on the display unit 14. A management screen SC1 of FIG. 10 is the same as the management screen 300 of FIG. 6. A management screen SC2 shows a screen which is displayed in S302 due to the button B1 in the management screen SC1 (i.e. management screen 300) being selected. The management screen SC2 includes a button 133 indicating "Show Tank" instead of the button B1. Further, the management screen SC2 includes alternative remaining amount OBJs 320a', 320b' instead of the remaining amount OBJs 320a, 320b. The alternative remaining amount OBJs 320a', 320b' include alternative CTG OBJs 321a', 321b' respectively indicating the ink remaining amounts in the CTGs 200a, 200b, but does not include the tank OBJs 322a, 322b. A method of the CPU 32 creating the alternative remaining amount OBJs 320a', 320b' will be described below.

When the CPU 32 creates the alternative remaining amount OBJ 320a' corresponding to the printer 100a for example, the CPU 32 firstly acquires the piece of the management information corresponding to the printer 100a from the management DB 40. Subsequently, the CPU 32 calculates a length of a remaining area of the alternative CTG OBJ 321a'. Specifically, the CPU 32 calculates the length of the remaining area of the alternative CTG OBJ by using the formula "length L×CTG remaining rate/100".

Here, the length L in the formula is the same as the L used in S240 of FIG. 8. The CTG remaining rate in the formula is the CTG remaining rate included in the acquired piece of management information and rounded off to the nearest ten. The CPU 32 fills an area having the calculated length in a band-shaped rectangular OBJ having the length L. In particular, in the present embodiment, this area is filled from the left end toward the right side of the rectangle OBJ. Thereby, the alternative CTG OBJ 321a' including the remaining area having the calculated length is completed. Further, the CPU 32 arranges the alternative CTG OBJ 321a' instead of the remaining amount OBJ 320a such that the left end of the alternative CTG OBJ 321a' is located on the virtual straight line P1. Similarly, the CPU 32 arranges the CTG 321b' instead of the remaining amount OBJ 320b by using a piece of the management information corresponding to the printer 100b. Due to this, the CPU 32 can display the management screen SC2 instead of the management screen SC1. When S302 ends, the process returns to the monitoring of S300, etc.

As aforementioned, the CPU 32 can display the management screen SC2 including the alternative remaining amount OBJ 320a', 320b' which do not include the tank OBJs 322a, 322b in the case where the button B1 is selected. Due to this, the administrator can easily recognize the ink remaining amounts in the respective CTGs 200a, 200h in the respective sub-tank model printers 100a, 100b. Accordingly, convenience for the administrator can be improved.

Further, the CPU; 32 uses a length that is same as the length L, which was used in S240 of FIG. 8 as the length of each of the alternative CTG OBJs 321a', 321b'. Accordingly, in the left-right direction, the length of the alternative CTG OBJ of each sub-tank model (e.g. 321a') and the length of the CTG OBJ of each CTG model (e.g., 321c) are equal to each other. Due to this, the administrator can easily recognize the ink remaining amounts in the respective CTG 200a, 200b of the respective sub-tank model printers 100a, 100b and the ink remaining amounts in the respective CTGs 200c, 200d in the respective CTG model printers 100c, 100d. Accordingly, convenience for the administer can be improved.

Further, the positions of the left ends of the respective alternative CTG OBJs 321a', 321b' of the sub-tank model and the positions of the left ends of the CTG ORJs 321c, 321d of the CTG model are equal to each other. That is, in the left-right direction, the positions (i.e. left ends) of the respective alternative CTG OBJs 321a', 321b corresponding to the ink remaining amounts in the CTGs being zero and the positions (i.e. left ends) of the respective CTG OBJs 321c, 321d corresponding to the ink remaining amounts in the CTGs being zero (i.e. unprintable amount) are equal to each other. Due to this, the administrator can easily recognize the ink remaining amounts in the respective CTGs 200a, 200b of the sub-tank model printers 100a, 100b and the ink remaining amounts in the respective CTGs 200c, 200d of the CTG model printers 100c, 100d, using the common position (i.e., position corresponding to ink in CTG being zero) as a reference. Accordingly, convenience for the administrator can be improved.

In a case where the button B3 indicating "Show Tank," in the management screen SC2 is selected, the CPU 32 determines YES in S310 and proceeds to S312.

In S312, the CPU 32 displays the management screen SC1 instead of the management screen SC2 on the display unit 14. A method of displaying the management screen SC1 is the same as S200 to S260 of FIG. 8. When S312 ends, the process returns to the monitoring of S300, etc.

In a case where the button B2 indicating "Sort" in the management screen SC1 is selected, the CPU 32 determines YES in S320 and proceeds to S322.

In S322, the CPU 32 displays a management screen in which the order of the plural remaining amount OBJs RN 320a to 320d is sorted in a descending order of the ink remaining amounts. FIG. 11 shows a management screen SC3 in which the ink remaining amounts are sorted in the descending order. A method of the CPU 32 displaying the management screen SC3 will be described below.

The CPU 32 firstly acquires the respective total remaining rates included in the pieces of the management information which correspond to the respective printers 100a to 100d from the management DB 40. Subsequently, the CPU 32 arranges the remaining amount OBJ which corresponds to a greatest total remaining rate among the acquired total remaining rates at an uppermost spot. For example, in the example of the management DB 40 in FIG. 5, the CPU 32 arranges the remaining amount OBJ 320d of the printer 100d at the uppermost spot. Subsequently, the CPU 32 arranges the remaining amount OBJ which corresponds to a second greatest total remaining rate among the acquired total remaining rates at a second uppermost spot. Similarly, the CPU 32 sequentially arranges the respective remaining OBJs in the descending order of the total remaining rates from up to down. Due to this, the CPU 32 can display the management screen SC3 instead of the management screen SC1. When S322 ends, the process returns to the monitoring of S300, etc.

As aforementioned, in the case where the button B2 is selected, the CPU 32 can display the management screen SC3 in which the order of the plural remaining amount OBJs 320a to 320d is sorted in the descending order of the ink remaining amounts. Due to this, the administrator can easily recognize the printer 100d whose ink remaining amount is great.

In the case where the button B2 indicating "Sort" in the management screen SC3 is selected, the CPU 32 determines YES in S330 and proceeds to S332.

In S332, the CPU 32 displays a management screen in Which the order of the plural remaining amount OBJs 320a to 320d is sorted in an ascending order of the ink remaining amounts. FIG. 11 shows a management screen SC4 in which the ink remaining amounts are sorted in the ascending order. A method of the CPU 32 displaying the management screen SC4 will be described below.

The CPU 32 acquires, similar to S322, the respective total remaining rates from the management DB 40. Subsequently, the CPU 32 arranges the remaining amount OBJ which corresponds to a smallest total remaining rate among the acquired total remaining rates at the uppermost spot. For example, in the example of the management DB 40 in FIG. 5, the CPU 32 arranges the remaining amount OBJ 320b of the printer 100b at the uppermost spot. Subsequently, the CPU 32 arranges the remaining amount OBJ which corresponds to a second smallest total remaining rate among the acquired total remaining rates at the second uppermost spot. Similarly, the CPU 32 sequentially arranges the respective remaining OBJs in the ascending order of the total remaining rates from up to down. Due to this, the CPU 32 can display the management screen SC4 instead of the management screen SC3. When S332 ends, the process returns to the monitoring of S300, etc.

As aforementioned, in the case where the button B2 in the management screen SC3 is selected, the CPU 32 can display the management screen SC4 in which the order of the plural remaining amount OBJs 320a to 320d is sorted in the ascending order of the ink remaining amounts. Due to this, the administrator can easily recognize the printer 100*b* Whose ink remaining amount is small.

(Correspondence Relationship)

The management server 10, the sub-tank model printer 100*a*, and the CTG model printer 100*c* are an example of "information processing device", "first-type printer", and "second-type printer", respectively. The print executing unit 160*a*, the sub-tank 175*a*, the CTG 200*a*, the print executing unit 160*c*, and the CTG 200*c* are an example of "first print executing unit", "tank", "first cartridge", "second print executing unit", and "second cartridge", respectively. The printer 100*a* and the printer 100*b* are an example of "first printer" and "second printer", respectively. The printer 100*c* and the printer 100*d* are an example of "third printer" and "fourth printer", respectively. The ink is an example of "colorant". The black is an example of "predetermined color". The pieces of ink information 140*a* to 140*d* are an example of "remaining amount information". In the sub-tank model printer 100*a*, the tank remaining rate being zero percent is an example of "unprintable remaining amount". In the CTG model printer 100*c*, the CTG remaining rate being zero percent is an example of "unprintable remaining amount."

The management screen 300 is an example of "remaining amount screen". The left-right direction is an example of "predetermined direction". The remaining amount OBJ 320*a* and the remaining amount OBJ 320*c* are an example of "first-type remaining amount object" and "second-type remaining amount object", respectively. The CTG OBJ 321*a*, the tank OBJ 322*a*, and the CTG OBJ 321*c* are an example of "first cartridge object", "tank object", and "second cartridge object", respectively. The left end of the tank OBJ 322*a* and the left end of the CTG OBJ 321*c* are an example of "position of the tank object corresponding to the unprintable remaining amount in the first-type remaining amount object" and "position of the second cartridge object corresponding to the unprintable remaining amount in the second-type remaining amount object", respectively. The management screen SC2 of FIG. 10, the management screen SC3 of FIG. 11, and the management screen SC4 of FIG. 11 are an example of "alternative remaining amount screen", "first sorted remaining amount screen" and "second sorted remaining amount screen", respectively. In the management screen SC2 of FIG. 10, the left end of the alternative CTG OBJ 320*a*' and the left end of the CTG OBJ 320*c* are an example of "alternative cartridge object corresponding to the remaining amount of colorant in the first cartridge being zero" and "second cartridge object corresponding to the unprintable remaining amount", respectively. The selection of the button B1 is an example of "first instruction" and the selection of the button B2 is an example of "second instruction" and "third instruction". The descending order of the ink remaining amounts is an example of "predetermined rule".

The process of S12 and the process of S22 in FIG. 6 are an example of "acquire remaining amount information" and "display remaining amount screen".

(Variant 1) The management server 10 may create a remaining amount OBJ which does not have a rectangular object in S234, S242 of FIG. 8. That is, the management server 10 may create a remaining amount OBJ having a length corresponding only to the remaining area. In the present embodiment, in a case where the CTG remaining rate corresponding to a sub-tank model printer (e.g. 100*a*) is 100% also the CTG remaining rate corresponding to a CTG model printer (e.g. 100*c*) is 100%, the length of the remaining amount OBJ corresponding to the sub-tank model in the left-right direction and the length of the remaining amount OBJ corresponding to the CTG model printer in the left-right direction are equal to each other. Generally speaking, in a case where a configuration in which objects not having a rectangular object (that is, remaining amount object, tank object, and cartridge object) are adopted and also lengths of these two objects corresponding to any two printers in a predetermined direction are equal to each other is adopted, the lengths of the two objects in the predetermined direction simply need to be equal to each other in a state where remaining amounts of colorant corresponding to these objects are at maximum.

(Variant 2) In the management screen 300 of FIG. 6, there are various pairs of OBJS having the same length (e.g. 320*a* and 320*c*, 322*a* and 322*b*, 321*a* and 321*b*, and 321*c* and 321*d*). Alternatively, lengths of two objects may be different from each other as in the following variants 2-1 to 2-4.

(Variant 2-1) The length of a remaining amount OBJ (e.g. 320*a*) corresponding to a sub-tank model printer (e.g. 100*a*) and the length of a remaining amount OBJ (e.g. 320*c*) corresponding to a CTG model printer (e.g. 100*c*) may be different from each other.

(Variant 2-2) In a case where the size of the interior space of the sub-tank of the printer 100*a* is greater than the size of the interior space of the sub-tank of the printer 100*b*, the length of the tank OBJ corresponding to the printer 100*a* may be longer than the length of the tank OBJ corresponding to the printer 100*b*.

(Variant 2-3) in a case where the size of the interior space of the CTG 200*a* of the printer 100*a* is greater than the size of the interior space of the GIG 200*b* of the printer 100*b*, the length of the CTG OBJ corresponding to the printer 100*a* may be longer than the length of the CTG corresponding to the printer 100*b*.

(Variant 2-4) In a case where the size of the interior space of the CTG 200*c* of the printer 100*c* is greater than the size of the interior space of the CTG 200*d* of the printer 100*d*, the length of the GIG OBJ corresponding to the printer 100*c* may be longer than the length of the CTG OBJ corresponding to the printer 100*d*.

(Variant 3) The management screen 300 may not include the button B1. That is, the management server 10 may not be configured to display the management screen SC2 of FIG. 10. Generally speaking, "alternative remaining amount screen" may not be displayed.

(Variant 4) The management server 10 may display a management screen which includes respective alternative CTG OBJs by simply deleting, the tank OBJs 322*a*, 322*b* from the management screen SC1 of FIG. 10. In this case, the lengths of the alternative CTG OBJs may be different from the CTG OBJ(s) (e.g. 321*c*). Further, the position(s) of the left end(s) of the alternative CTG OBJ(s) may be different from the position(s) of the left end(s) of the CTG OBJ(s) (e.g. 321*c*).

(Variant 5) The management screen 300 may not include the button B2. That is, the management server 10 may not be configured to display the management screen SC3 of FIG. 11. Generally speaking, "first sorted remaining amount screen" may not be displayed. Further, the management screen SC3 may not include the button B2. That is, the management server 10 may not be configured to display the management screen SC4. Generally speaking, "second sorted remaining amount screen" may not be displayed.

(Variant 6) In a case where the button B2 in the management screen 300 is selected, the management server 10 may not sort the remaining amount OBJs 320*a* to 320*d* according to the total remaining rates, but may sort them according to the GIG remaining rates. Further, the management server 10 may not sort using the remaining rates, but may sort according to the total number of remaining sheets, and may sort according to the total number of sheets. In these variants, the GIG remaining rate, the number of remaining, sheets, and the total number of sheets are examples of the "predetermined rule".

(Variant 7) S12 of FIG. 6, instead of acquiring the number of total sheets TO, the number of tank sheets TA, and the number of remaining sheets RE from each of the printers 100*a*, etc., the management server 10 may acquire, from each of the printers 100*a*, etc., other information related to the remaining ink amount in the printer. For example, each CTG mounted in the printer 100*a*, etc. may comprise a sensor configured to detect a liquid level in the CTG, and the ink remaining amount in the CTG may be calculated based on this liquid level. Further, each of the sub-tank model printers 100*a*, etc. may comprise a sensor configured to detect a liquid level in the sub-tank 175*a*, and the ink remaining amount in the sub-tank 175*a* may be calculated based on this liquid level. In this case, the management server 10 acquires, from each of the sub-tank model printers 100*a*, etc., a total amount of ink stored in a new CTG (the unit is, e.g., cc, ml, cm$^3$, etc.), the ink remaining amount in the sub-tank 175*a*, and the ink remaining amount in the CTG. Further, the management server 10 acquires the total amount of ink stored in a new CTG and the ink remaining amount in the CTG from each of the CTG model printers 100*c*, etc. According to this configuration also, the management server 10 can calculate the CTG remaining rate, the tank remaining rate, and the total remaining rate, and can execute processes using these remaining rates. Further, in another variant, each of the sub-tank model printers 100*a*, etc. may be able to calculate the CTG remaining rate, the tank remaining rate and the total remaining rate. Further, each of the CTG model printers 100*c*, etc. may be able to calculate the CTG remaining rate and the total remaining rate. In this case, the management server 10 acquires the CTG remaining rate, the tank remaining rate and the total remaining rate from each of the sub-tank model printers 100*a*, etc. Further, the management server 10 acquires the CTG remaining rate and the total remaining rate from each of the CTG model printer 100*c*, etc. Generally speaking, the "remaining amount information" may be any information related to the remaining amount of colorant in the first-type (or second-type) printer.

(Variant 8) The sub-tank model printers 100*a*, etc. may shift from the printable state to the unprintable state in a case where the tank remaining rate reaches a predetermined value greater than 0% (e.g., 5%). Further, the CTG model printers 100*c*, etc. may shift from the printable state to the unprintable state in a case where the CTG remaining rate reaches a predetermined value greater than 0% (e.g., 5%). In the present variant, the remaining amount in the case where the tank remaining rate or the CTG remaining rate is the aforementioned predetermined value is an example of the "unprintable remaining amount", The unprintable remaining amounts of the first-type and the second-type printer may be the same remaining amount, or may be different remaining amounts.

(Variant 9) The CTG OBJs 321*a*, etc. and the tank OBJs 322*a*, etc. may each not have a band shape extending linearly along the left-right direction, but may have a band shape extending linearly along the up-down direction. In the present variant, the up-down direction is an example of "predetermined direction". Further, the CTG OBJs 321*a*, etc. and the tank OBJs 322*a*, etc. may each not have a band shape extending linearly, but may have a band shape that is curved. In the present variant, a direction in which the curved line extends is an example of the "predetermined direction".

(Variant 10) Each of the printers 100*a* to 100*d* may comprise a color printing mechanism (e.g., a printing mechanism using, four colors CMYK) instead of the monochrome priming mechanism in this case, in S12 of FIG. 6 the management server 10 may acquire pieces of information corresponding to the respective colors (i.e., the number of total Sheets, the number of tank sheets, and the number of remaining sheets), and display remaining amount OBIS corresponding to the respective colors by using the pieces of information corresponding to the colors, in particular, in this case, each remaining amount OBJ may, include a frame having a corresponding color, and a remaining area having the corresponding color. According to this configuration, the administrator can easily recognize which remaining amount OBJ is related to the remaining ink amount of which color. Also, in the present variant, in the management server 10 displaying the management screen in which the respective remaining amount OBJ are sorted in S322 or S332 of FIG. 9, the management server 10 may sort the remaining amount OBJs according to the remaining amount of ink of a different color than black, in the present variant, the above different color is an example of the "predetermined color".

(Variant 11) Each of the printers 100*a* to 100*d* may comprise a laser scheme printing mechanism instead of the ink jet scheme printing mechanism. In this case, a toner cartridge configured to store toner is mounted in each of the printers 100*a* to 100*d*. The sub-tank model printers 100*a*, etc, each comprises a sub-tank, configured to store toner supplied from the toner cartridge to the print executing unit. In the present variant, the toner is an example of the "colorant".

(Variant 12) The configuration in which the resolution of the remaining area of a tank OW is higher than the resolution of the remaining area of a CTG OBJ may be realized in a following way. A length of the remaining area of a tank OBJ which changes when a certain amount of ink (e.g., same number of printed sheets, same amount) is consumed may be greater than a length of the remaining area of CTG OBJ which changes when the above certain amount of ink (i.e., same ink amount) is consumed. For example, a situation in which the total number of sheets of the printer 100*a* is 5000 sheets and the number of tank sheets of the printer 100*a* is 200 Sheets will be assumed. In this case, the printable number of sheets (hereafter, "CTG number of sheets) after a new CTG 200*a* has been mounted in the printer 100*a* until the ink in the CTG 200*a* is fully consumed is 4800 sheets (i.e. 5000-200). That is, a ratio of the tank number of sheets to the CTG number of sheets is 1:24, in the present variant, a ratio of the length L2 of the tank OBJ to the length L1 of the CTG OBJ is 1:12, in this case, the length of the remaining area a the tank OBJ which changes when the certain amount of ink is consumed is twice the length of the remaining amount of the CTG when the certain amount of ink is consumed. Thus, in the present variant, in the case where the same amount of ink is consumed, the change in the length of the remaining area of the tank OBJ is greater than the change in the length of the remaining area of the CTG OBJ. Due to this, the user can easily recognize the change in the length of the remaining area of the tank OBJ. This accordingly makes it easier for the user to acknowledge that the printer 100*a* will soon be unprintable and enables the user to replace the CTG with a new one appropriately.

Generally speaking, "display a remaining amount screen" may comprise displaying a remaining amount screen so that change in the length of the tank object is greater than change in the length of the first cartridge object in a case where a same amount of colorant is consumed.

(Variant 13) In each of the above embodiments, the respective processes of FIG. 6 to FIG. 9 are implemented by software (i.e., the management application 38). However, at least one of these processes may be implemented by hardware such as a logic circuit.

What is claimed is:

1. A non-transitory computer-readable recording medium storing computer-readable instructions for an information processing device,
    wherein the computer-readable instructions, when executed by a processor of the information processing device, cause the information processing device to:
    acquire, from each of a plurality of printers, remaining amount information related to a remaining amount of colorant in the printer; and
    display a remaining amount screen on a display unit of the information processing device using a plurality of the acquired remaining amount information, wherein the remaining amount screen includes remaining amount objects each corresponding to respective one of the plurality of printers, and each remaining amount object indicates a remaining amount of colorant in corresponding one of the plurality of printers,
    wherein
    the plurality of printers includes at least one first-type printer and at least one second-type printer,
    each of the at least one first-type printer comprises a first print executing unit and a tank configured to store colorant supplied from a first cartridge to the first print executing unit,
    each of the at least one second-type printer comprises a second print executing unit and does not comprise a tank configured to store colorant supplied from a second cartridge to the second print executing unit,
    each of the at least one first-type printer and the at least one second-type printer shifts from a printable state to an unprintable state in a case where the remaining amount of colorant in the printer reaches an unprintable remaining amount,
    the remaining amount screen includes a first-type remaining amount object corresponding to the at least one first-type printer and a second-type remaining amount object corresponding to the at least one second-type printer,
    the first-type remaining amount object includes a first cartridge object which indicates a remaining amount of colorant in the first cartridge and a tank object which indicates a remaining amount of colorant in the tank,
    the first cartridge object has a band shape extending along a predetermined direction,
    the tank object has a band shape extending along the predetermined direction,
    the first cartridge object and the tank object are aligned along the predetermined direction,
    the second-type remaining amount object includes a second cartridge object which indicates a remaining amount of colorant in the second cartridge,
    the second cartridge object has a band shape extending along the predetermined direction,
    in the predetermined direction, a position of the tank object corresponding to the unprintable remaining amount in the first-type remaining amount object and a position of the second cartridge object corresponding to the unprintable remaining amount in the second-type remaining amount object are same as each other, and
    the remaining amount screen simultaneously displays the first-type remaining amount object and the second-type remaining amount object.

2. The non-transitory computer-readable recording medium as in claim 1, wherein
    a length of the first-type remaining amount object in the predetermined direction and a length of the second-type remaining amount object in the predetermined direction are equal to each other.

3. The non-transitory computer-readable recording medium as in claim 1, wherein
    the plurality of printers includes a first printer which is one of the at least one first-type printer and a second printer which is another one of the at least one first-type printer,
    a size of an interior space of the tank of the first printer and a size of an interior space of the tank of the second printer are different from each other, and
    a length of the tank object included in the first-type remaining amount object corresponding to the first printer in the predetermined direction and a length of the tank object included in the first-type remaining amount object corresponding to the second printer in the predetermined direction are equal to each other.

4. The non-transitory computer-readable recording medium as in claim 1, wherein
    the plurality of printers includes a first printer which is one of the at least one first-type printer and a second printer which is another one of the at least one first-type printer,
    a size of an interior space of the first cartridge mounted in the first printer and a size of an interior space of the first cartridge mounted in the second printer are different from each other, and
    a length of the first cartridge object included in the first-type remaining amount object corresponding to the first printer in the predetermined direction and a length of the first cartridge object included in the first-type remaining amount object corresponding to the second printer in the predetermined direction are equal to each other.

5. The non-transitory computer-readable recording medium as in claim 1, wherein
    the plurality of printers includes a third printer which is one of the at least one second-type printer and a fourth printer which is another one of the at least one second-type printer,
    a size of an interior space of the second cartridge mounted in the third printer and a size of an interior space of the second cartridge mounted in the fourth printer are different from each other, and
    a length of the second cartridge object included in the second-type remaining amount object corresponding to the third printer in the predetermined direction and a length of the second cartridge object included in the second-type remaining amount object corresponding to the fourth printer in the predetermined direction are equal to each other.

6. The non-transitory computer-readable recording medium as in claim 1, wherein
    the computer-readable instructions, when executed by the processor, further cause the information processing device to:

in a case where a first instruction is given in a state where the remaining amount screen is displayed, display an alternative remaining amount screen including an alternative remaining amount object instead of the first-type remaining amount object on the display unit, and the alternative remaining amount object includes an alternative cartridge object indicating the remaining amount of colorant in the first cartridge, but does not include the tank object.

7. The non-transitory computer-readable recording medium as in claim 6, wherein in the alternative remaining amount screen, a length of the alternative cartridge object included in the alternative remaining amount object in the predetermined direction and a length of the second cartridge object included in the second-type remaining amount object in the predetermined direction are equal to each other.

8. The non-transitory computer-readable recording medium as in claim 6, wherein in the alternative remaining amount screen, a position of the alternative cartridge object corresponding to the remaining amount of colorant in the first cartridge being zero and a position of the second cartridge object corresponding to the unprintable remaining amount are equal to each other.

9. The non-transitory computer-readable recording medium as in claim 1, wherein the computer-readable instructions, when executed by the processor, further cause the information processing device to:

in a case where a second instruction is given in a state where the remaining amount screen is displayed, display a first sorted remaining amount screen in which an order of the remaining amount objects is sorted according to a predetermined rule on the display unit.

10. The non-transitory computer-readable recording medium as in claim 9, wherein the predetermined rule is one of a descending order of remaining amounts of colorant of a predetermined color and an ascending order of the remaining amounts of colorant of the predetermined color.

11. The non-transitory computer-readable recording medium as in claim 10, wherein the computer-readable instructions, when executed by the processor, further cause the information processing device to:

in a case where a third instruction is given in a state where the first sorted remaining amount screen is displayed, display a second sorted remaining amount screen in which the order of the remaining amount objects is sorted according to the other of the descending order of the remaining amounts of colorant of the predetermined color and the ascending order of the remaining amounts of colorant of the predetermined color on the display unit.

12. An information processing device, comprising:

a controller, wherein the controller is configured to:

acquire, from each of a plurality of printers, remaining amount information related to a remaining amount of colorant in the printer; and display a remaining amount screen on a display unit of the information processing device using a plurality of the acquired remaining amount information, wherein the remaining amount screen includes remaining amount objects each corresponding to respective one of the plurality of printers, and each remaining amount object indicates a remaining amount of colorant in corresponding one of the plurality of printers, wherein the plurality of printers includes at least one first-type printer and at least one second-type printer, each of the at least one first-type printer comprises a first print executing unit and a tank configured to store colorant supplied from a first cartridge to the first print executing unit, each of the at least one second-type printer comprises a second print executing unit and does not comprise a tank configured to store colorant supplied from a second cartridge to the second print executing unit, each of the at least one first-type printer and the at least one second-type printer shifts from a printable state to an unprintable state in a case where the remaining amount of colorant in the printer reaches an unprintable remaining amount, the remaining amount screen includes a first-type remaining amount object corresponding to the at least one first-type printer and a second-type remaining amount object corresponding to the at least one second-type printer, the first-type remaining amount object includes a first cartridge object which indicates a remaining amount of colorant in the first cartridge and a tank object which indicates a remaining amount of colorant in the tank, the first cartridge object has a band shape extending along a predetermined direction, the tank object has a band shape extending along the predetermined direction, the first cartridge object and the tank object are aligned along the predetermined direction, the second-type remaining amount object includes a second cartridge object which indicates a remaining amount of colorant in the second cartridge, the second cartridge object has a band shape extending along the predetermined direction, and in the predetermined direction, a position of the tank object corresponding to the unprintable remaining amount in the first-type remaining amount object and a position of the second cartridge object corresponding to the unprintable remaining amount in the second-type remaining amount object are same as each other, and the remaining amount screen simultaneously displays the first-type remaining amount object and the second-type remaining amount object.

13. A method executed by an information processing device; comprising:

acquiring, from each of a plurality of printers, remaining amount information related to a remaining amount of colorant in the printer; and displaying a remaining amount screen on a display unit of the information processing device using a plurality of the acquired remaining amount information, wherein the remaining amount screen includes remaining amount objects each corresponding to respective one of the plurality of printers, and each remaining amount object indicates a remaining amount of colorant in corresponding one of the plurality of printers, wherein the plurality of printers includes at least one first-type printer and at least one second-type printer, each of the at least one first-type printer comprises a first print executing unit and a tank configured to store colorant supplied from a first cartridge to the first print executing unit, each of the at least one second-type printer comprises a second print executing unit and does not comprise a tank configured to store colorant supplied from a second cartridge to the second print executing unit, each of the at least one first-type printer and the at least one second-type printer shifts from a printable state to an unprintable state in a case where the remaining amount of colorant in the printer reaches an unprintable remaining amount, the remaining amount screen includes a first-type remaining amount object corresponding to the at least one first-type printer and a second-type remaining amount object corresponding to the at least one second-type printer, the first-type remaining amount object includes a first cartridge object which indicates a remaining amount of colorant in the first cartridge and a tank object which indicates a remaining amount of colorant in the tank, the first cartridge object has a band shape extending along a predetermined direction, the tank object has a band shape extending along the predetermined direction, the first cartridge object and the tank object are aligned along the predetermined direction, the second-type remaining amount object includes a second cartridge object which indicates a remaining amount of colorant in the second cartridge, the second cartridge object has a band shape extending along the predetermined direction, and in the predetermined direction, a position of the tank object corresponding to the unprintable remaining amount in the first-type remaining amount object and a position of the second cartridge object corresponding to the unprintable remaining amount in the second-type remaining amount object are same as each other, and the remaining amount screen simultaneously displays the first-type remaining amount object and the second-type remaining amount object.

\* \* \* \* \*